(12) United States Patent
Takasan et al.

(10) Patent No.: US 7,786,650 B2
(45) Date of Patent: Aug. 31, 2010

(54) ULTRASONIC MOTOR

(75) Inventors: Masaki Takasan, Aichi (JP); Tsuyoshi Kodera, Aichi (JP); Hirohiko Ishikawa, Aichi (JP); Koji Maeda, Aichi (JP); Kazuo Seiki, Aichi (JP)

(73) Assignee: Kabushiki Kaisha Toyota Jidoshokki, Aichi (JP)

( * ) Notice: Subject to any disclaimer, the term of this patent is extended or adjusted under 35 U.S.C. 154(b) by 182 days.

(21) Appl. No.: 11/991,709

(22) PCT Filed: Jul. 27, 2006

(86) PCT No.: PCT/JP2006/314841

§ 371 (c)(1),
(2), (4) Date: Mar. 6, 2008

(87) PCT Pub. No.: WO2007/055052

PCT Pub. Date: May 18, 2007

(65) Prior Publication Data

US 2009/0051249 A1     Feb. 26, 2009

(30) Foreign Application Priority Data

Nov. 10, 2005 (JP) ............................. 2005-326234
Nov. 10, 2005 (JP) ............................. 2005-326241
Nov. 10, 2005 (JP) ............................. 2005-326245

(51) Int. Cl.
*H01L 41/053* (2006.01)
*H02N 2/12* (2006.01)

(52) U.S. Cl. .............................. 310/323.01; 310/323.05

(58) Field of Classification Search ................. 310/321, 310/323.01–323.21, 328
See application file for complete search history.

(56) References Cited

U.S. PATENT DOCUMENTS 6,885,132 B2 *  4/2005  Takemura et al. ...... 310/316.01

FOREIGN PATENT DOCUMENTS

JP        62-228392        10/1987

(Continued)

OTHER PUBLICATIONS

Machine translation of JP 2004-312809 generated by the website of the Japanese Patent Office.*
Machine translation of JP 2002-315366 generated by the website of the Japanese Patent Office.*

(Continued)

*Primary Examiner*—Walter Benson
*Assistant Examiner*—Derek J Rosenau
(74) *Attorney, Agent, or Firm*—Locke Lord Bissell & Liddell LLP

(57) ABSTRACT

Provided is an ultrasonic motor capable of realizing high torque. When two terminals are selected from a first terminal (31*t*), a second terminal (32*t*), and a third terminal (33*t*) of a vibrator (3), and AC voltages whose phases are shifted by 90 degrees relative to each other are respectively applied through both of those two terminals, vibration is generated in the stator vibration body (S), and elliptical vibration in a plane corresponding to the selected two terminals is generated at each of a step (9) of a first stator (2) and a corner (11) of a second stator (10), which are in contact with a rotor (6). Since the first stator (2) and the second stator (10) form the single stator vibration body (S), the step (9) of the first stator (2) and the corner (11) of the second stator (10) vibrate in the same vibration mode, rotational force is transmitted from both the step (9) of the first stator (2) and the corner (11) of the second stator (10), and the rotor (6) rotates with high torque.

26 Claims, 17 Drawing Sheets

FOREIGN PATENT DOCUMENTS

| | | | |
|---|---|---|---|
| JP | 07-080793 | * | 3/1995 |
| JP | 2002-315366 | * | 10/2002 |
| JP | 2003-348860 | | 12/2003 |
| JP | 2004-140941 | | 5/2004 |
| JP | 2004-312809 | | 11/2004 |

OTHER PUBLICATIONS

Machine translation of JP 07-080793 generated by the website of the Japanese Patent Office.*

International Search Report of corresponding International Application No. PCT/JP2006/314841, mailed Oct. 24, 2006.

* cited by examiner

ULTRASONIC MOTOR

TECHNICAL FIELD

The present invention relates to an ultrasonic motor, in particular, to a motor which rotates a rotor while holding it in press contact with a stator.

BACKGROUND ART

In recent years, an ultrasonic motor which rotates a rotor by utilizing ultrasonic vibration has been proposed and put into practical use. In this ultrasonic motor, progressive wave is generated on the surface of a stator by using a piezoelectric element, and the stator is held in press contact with a rotor, whereby the rotor is moved by virtue of a frictional force therebetween.

For example, Patent Document 1 discloses a multiple-degree-of-freedom ultrasonic motor in which a rotor is held in press contact with a stator by applying a preload to the rotor by means of a spring through a bearing, and, in this state, a drive voltage is applied to a plurality of piezoelectric element plates superimposed one upon the other to generate ultrasonic vibration in the stator, thereby rotating the rotor. Here, the term "preload" means a pressure with which the rotor is pressed against the stator at least in a state in which no electricity is being supplied to the piezoelectric elements.

Patent Document 1: JP 2004-312809 A

DISCLOSURE OF THE INVENTION

Problem to be Solved by the Invention

However, since the bearing is held in contact with the rotor so as to apply the preload, there is involved a reduction in torque due to frictional loss.

The present invention has been made with a view to solve the above problem in the related art. It is therefore an object of the present invention to provide an ultrasonic motor capable of realizing high torque.

Means for Solving the Problems

An ultrasonic motor according to a first aspect of the present invention includes: a plurality of stators arranged so as to be opposed to each other; a substantially spherical rotor held by the plurality of stators; and a single stator vibration means provided commonly for the plurality of stators and vibrating the plurality of stators so as to generate driving forces in the same direction to rotate the rotor.

An ultrasonic motor according to a second aspect of the present invention includes: a stator; a rotor held in contact with and supported by the stator; a stator vibration means that vibrates the stator to rotate the rotor; a preload member arranged so as to be held in contact with a surface of the rotor at least when the ultrasonic motor is at rest; and a preload member vibration means for preloading the rotor with respect to the stator by vibrating the preload member.

An ultrasonic motor according to a third aspect of the present invention includes: a stator; a substantially spherical rotor held in contact with and supported by the stator; a stator vibration means that vibrates the stator to rotate the rotor; a preload member opposed to the surface of the rotor; and a preload member vibration means for vibrating the preload member at least when rotating the rotor to generate a preloading force for preloading the rotor with respect to the stator by a radiation pressure from the preload member.

EFFECT OF THE INVENTION

According to the present invention, it is possible to obtain an ultrasonic motor capable of realizing high torque.

BEST MODES FOR CARRYING OUT THE INVENTION

In the following, embodiments of the present invention will be described with reference to the accompanying drawings.

Embodiment 1

Figure 1:
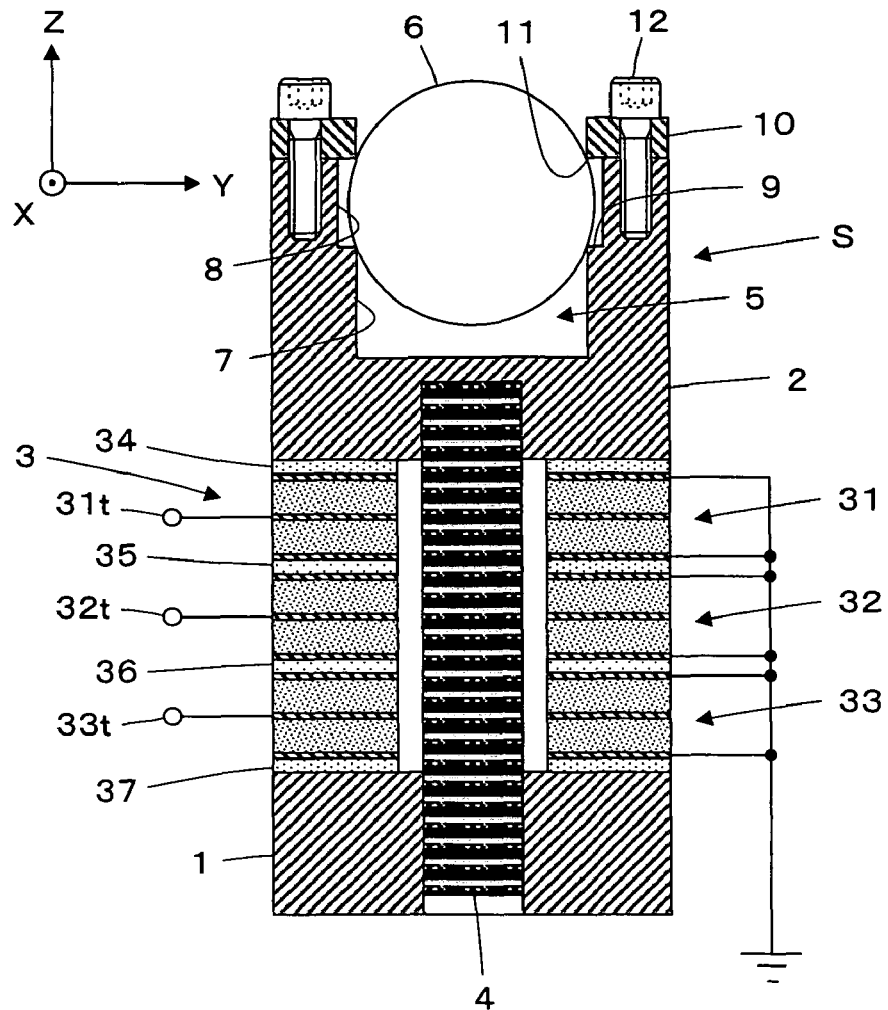
FIG. 1 is a sectional view showing an ultrasonic motor according to Embodiment 1 of the present invention.
Figure 2:
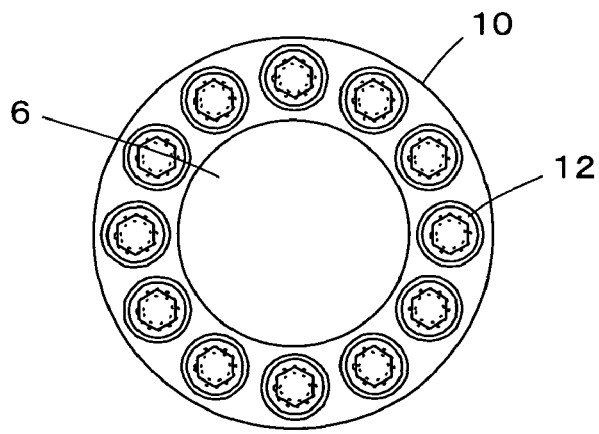
FIG. 2 is a plan view showing the ultrasonic motor of Embodiment 1.

FIGS. 1 and 2 show a multi-degree-of-freedom ultrasonic motor according to Embodiment 1 of the present invention. A cylindrical vibrator 3 constituting a stator vibrating means is held between a base block 1 and a first stator 2, and the base block 1 and the first stator 2 are connected to each other by a connection bolt 4 passed through the vibrator 3. The multi-degree-of-freedom ultrasonic motor as a whole exhibits a substantially columnar outward appearance. Here, for the sake of convenience in illustration, the central axis of the columnar outer configuration extending from the base block 1 toward the first stator 2 will be referred to as Z-axis; an X-axis extends perpendicularly to the Z-axis, and a Y-axis extends perpendicularly to the Z-axis and the X-axis.

The vibrator 3 has flat-plate-like first to third piezoelectric element portions 31 to 33 situated in the XY-plane and superimposed one upon the other; the piezoelectric element portions 31 to 33 are insulated from the stator 2 and the base block 1 and from each other through insulation sheets 34 to 37.

On the side of the first stator 2 opposite to the surface thereof in contact with the vibrator 3, there is formed a recess 5, in which a substantially spherical rotor 6 is accommodated. The recess 5 includes a small diameter portion 7 whose inner diameter is smaller than the diameter of the rotor 6 and a large diameter portion 8 whose inner diameter is larger than the diameter of the rotor 6. At the boundary portion between the small diameter portion 7 and the large diameter portion 8, there is formed an annular step 9 situated in the XY-plane.

Further, an annular second stator 10 is arranged on top of the first stator 2 so as to be adjacent thereto in the Z-axis direction, and an annular corner 11 situated in the XY-plane is formed at the inner peripheral edge of the second stator 10. The second stator 10 is firmly fixed to the first stator 2 by means of a large number of, for example, twelve, fixation bolts 12, and the first stator 2 and the second stator 10 form a single stator vibration body S vibrating in the same vibration mode with respect to a vibration imparted from the vibrator 3.

The rotor 6 is held between the step 9 in the recess 5 and the corner 11 of the second stator 10 while in contact with both, and is supported rotatably.

For example, the base block 1, the first stator 2, and the second stator 10 are formed of duralumin, and the multi-degree-of-freedom ultrasonic motor as a whole is formed as a substantially columnar body having a diameter of 40 mm and a height of approximately 100 mm. A steel ball having a diameter of 25.8 mm is used as the rotor 6.

Figure 3:
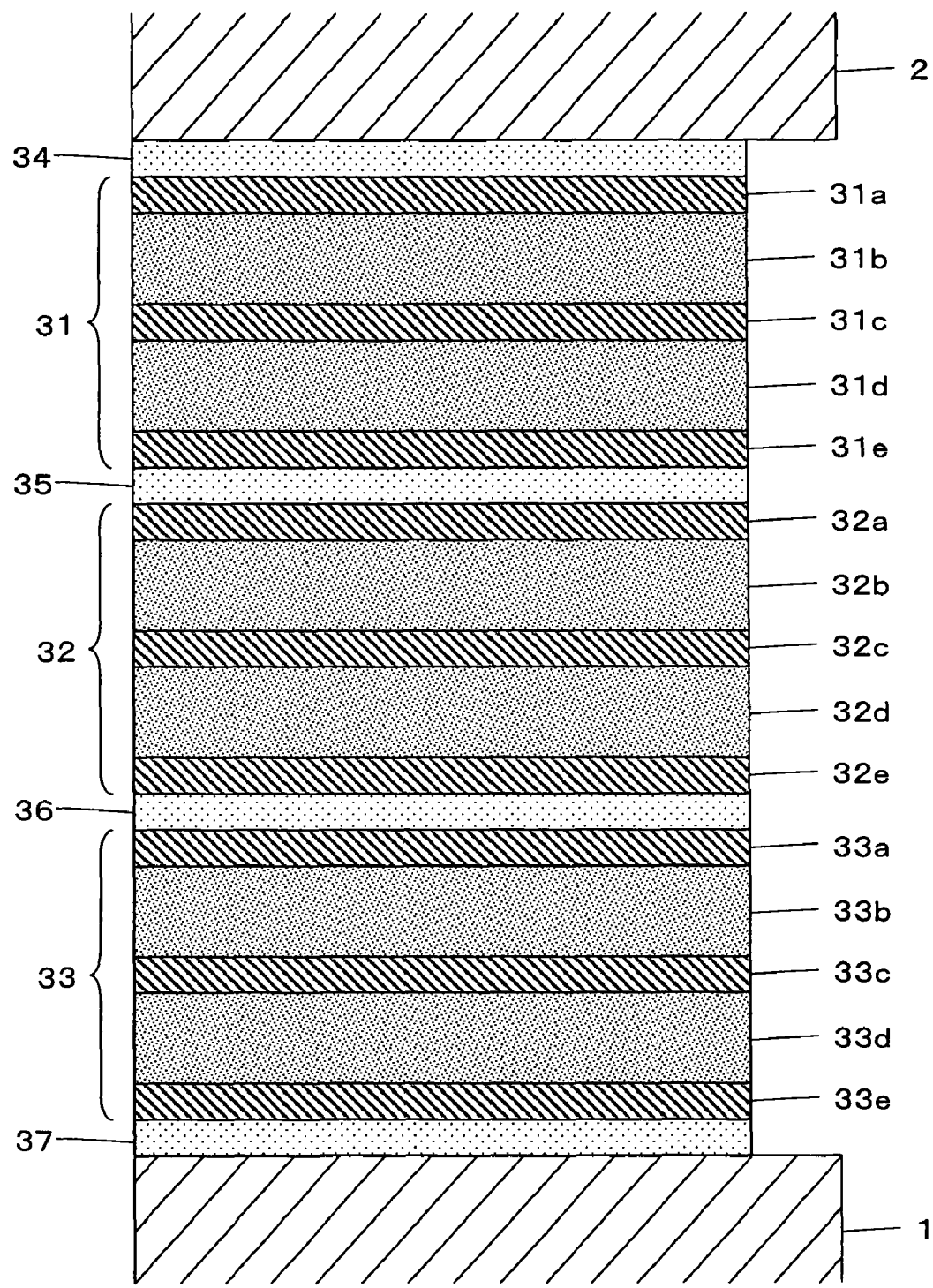
FIG. 3 is a partial sectional view showing the construction of a vibrator used in Embodiment 1.

As shown in FIG. 3, the first piezoelectric element portion 31 of the vibrator 3 has a construction in which an electrode plate 31a, a piezoelectric element plate 31b, an electrode plate 31c, a piezoelectric element plate 31d, and an electrode plate 31e, all in a disc-like configuration, are successively superimposed one upon the other. Similarly, the second piezoelectric element portion 32 has a construction in which an electrode plate 32a, a piezoelectric element plate 32b, an electrode plate 32c, a piezoelectric element plate 32d, and an electrode plate 32e, all in a disc-like configuration, are successively superimposed one upon the other. The third piezoelectric element portion 33 has a construction in which an electrode plate 33a, a piezoelectric element plate 33b, an electrode plate 33c, a piezoelectric element plate 33d, and an electrode plate 33e, all in a disc-like configuration, are successively superimposed one upon the other.

Figure 4:
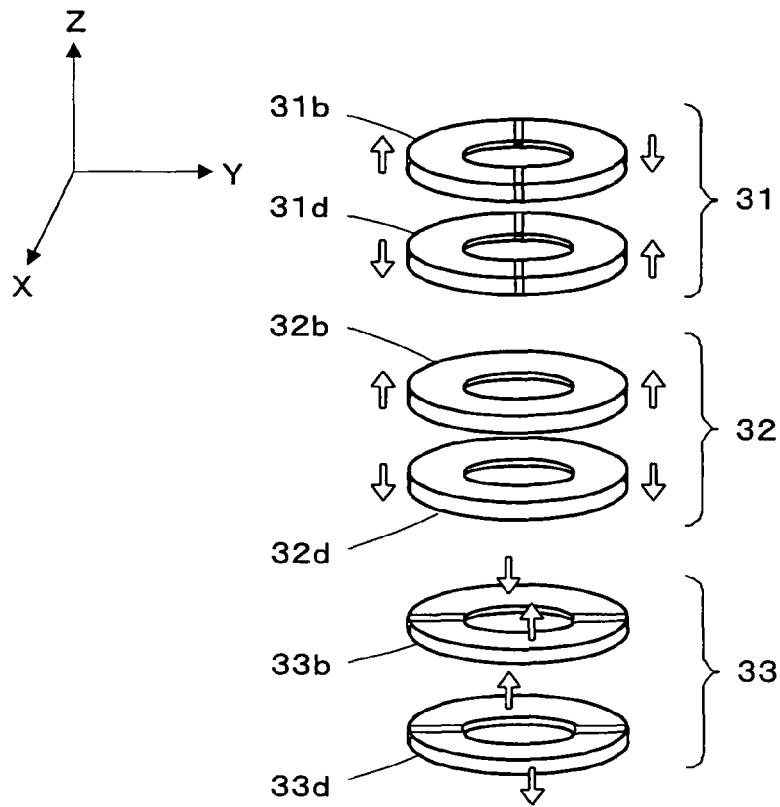
FIG. 4 is a perspective view showing the polarizing directions of three pairs of piezoelectric element plates of the vibrator used in Embodiment 1.

As shown in FIG. 4, each of the pair of piezoelectric element plates 31b and 31d of the first piezoelectric element portion 31 is divided in the Y-axis direction into two portions of opposite polarities; they are polarized so as to perform opposite deformation behaviors of expansion and contraction in the Z-axis direction (thickness direction), with the piezoelectric element plates 31b and 31d being arranged so as to be reversed with respect to each other.

None of the pair of piezoelectric element plates 32b and 32d of the second piezoelectric element portion 32 is divided into two portions; they are polarized so as to perform as a whole deformation behavior of expansion or contraction in the Z-axis direction (thickness direction), with the piezoelectric element plates 32b and 32d being arranged so as to be reversed with respect to each other.

Each of the pair of piezoelectric element plates 33b and 33d of the third piezoelectric element portion 33 is divided in the X-axis direction into two portions of opposite polarities; they are polarized so as to perform opposite deformation behaviors of expansion and contraction in the Z-axis direction (the thickness direction), with the piezoelectric element plates 33b and 33d being arranged so as to be reversed with respect to each other.

As shown in FIGS. 1 and 3, the electrode plate 31a and the electrode plate 31e arranged at both surface portions of the first piezoelectric element portion 31, the electrode plate 32a and the electrode plate 32e arranged at both surface portions of the second piezoelectric element portion 32, and the electrode plate 33a and the electrode plate 33e arranged at both surface portions of the third piezoelectric element portion 33, are respectively electrically grounded. Further, a first terminal 31t is led out from the electrode plate 31c arranged between the pair of piezoelectric element plates 31b and 31d of the first piezoelectric element portion 31, a second terminal 32t is led out from the electrode plate 32c arranged between the pair of piezoelectric element plates 32b and 32d of the second piezoelectric element portion 32, and a third terminal 33t is led out from the electrode plate 33c arranged between the pair of piezoelectric element plates 33b and 33d of the third piezoelectric element portion 33.

Next, the operation of the multi-degree-of-freedom ultrasonic motor of Embodiment 1 will be described.

First, when an AC voltage of a frequency approximate to the natural frequency of the stator vibration body S formed by the first stator 2 and the second stator 10 is applied through the first terminal 31t to the vibrator 3, the portions of the pair of piezoelectric element plates 31b and 31d of the first piezoelectric element portion 31 divided into two alternately repeat expansion and contraction in the Z-axis direction, and flexural vibration in the Y-axis direction is generated in the stator vibration body S. When an AC voltage of a frequency approximate to the natural frequency of the stator vibration body S is applied through the second terminal 32t, the pair of piezoelectric element plates 32b and 32d of the second piezoelectric element portion 32 repeat expansion and contraction in the Z-axis direction, and longitudinal vibration in the Z-axis direction is generated in the stator vibration body S.

When an AC voltage of a frequency approximate to the natural frequency of the stator vibration body S is applied through the third terminal 33t, the portions of the pair of piezoelectric element plates 33b and 33d of the third piezoelectric element portion 33 divided into two alternately repeat expansion and contraction in the Z-axis direction, and flexural vibration in the X-axis direction is generated in the stator vibration body S.

Thus, when AC voltages whose phases are shifted by 90 degrees relative to each other are respectively applied through both the first terminal 31t and the second terminal 32t, flexural vibration in the Y-axis direction and longitudinal vibration in the Z-axis direction are combined, and elliptical vibration in the YZ-plane is generated at the step 9 of the first stator 2 and the corner 11 of the second stator 10, which are in contact with the rotor 6, with the result that the rotor 6 rotates around the X-axis due to frictional force.

Similarly, when AC voltages whose phases are shifted by 90 degrees relative to each other are respectively applied through both the second terminal 32t and the third terminal 33t, flexural vibration in the X-axis direction and longitudinal vibration in the Z-axis direction are combined, and elliptical vibration in the XZ-plane is generated at the step 9 of the first stator 2 and the corner 11 of the second stator 10, which are in contact with the rotor 6, with the result that the rotor 6 rotates around the Y-axis due to frictional force.

Further, when AC voltages whose phases are shifted by 90 degrees relative to each other are respectively applied through both the first terminal 31t and the third terminal 33t, flexural vibration in the X-axis direction and flexural vibration in the Y-axis direction are combined, and elliptical vibration in the XY-plane is generated at the step 9 of the first stator 2 and the corner 11 of the second stator 10, which are in contact with the rotor 6, with the result that the rotor 6 rotates around the Z-axis due to frictional force.

Figure 5:
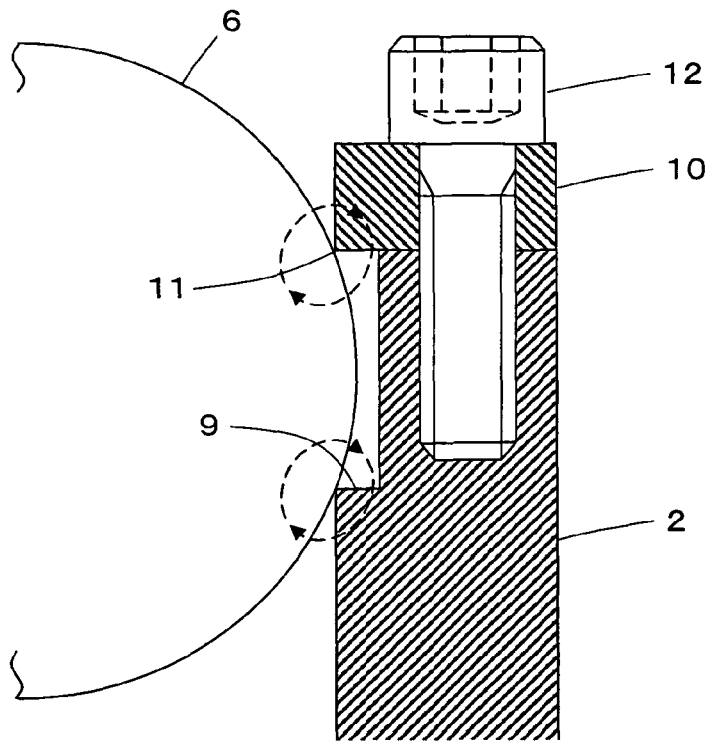
FIG. 5 is a partial enlarged sectional view showing the ultrasonic motor of Embodiment 1.

In this way, when two terminals are selected from the first terminal 31t, the second terminal 32t, and the third terminal 33t of the vibrator 3, and AC voltages whose phases are shifted by 90 degrees relative to each other are respectively applied through both of those two terminals, vibration is generated in the stator vibration body S and, as indicated by the arrow dashed lines of FIG. 5, elliptical vibration in a plane corresponding to the selected two terminals is generated at each of the step 9 of the first stator 2 and the corner 11 of the second stator 10, which are in contact with the rotor 6.

At this time, since the first stator 2 and the second stator 10 form the single stator vibration body S, the step 9 of the first stator 2 and the corner 11 of the second stator 10 vibrate in the same vibration mode. Thus, rotational force is transmitted from both the step 9 of the first stator 2 and the corner 11 of the second stator 10, and the rotor 6 rotates with high torque.

Thus, by mounting an arm, an image pick-up device or the like (not shown) to the surface portion of the rotor 6 exposed through the annular second stator 10, it is possible to realize a multi-degree-of-freedom actuator, a camera for wide field range or the like.

The number of the fixation bolts 12 for fixing the second stator 10 to the first stator 2 is not restricted to twelve; there are no limitations regarding the number of the fixation bolts 12 as long as it is possible to fix the second stator 10 so as to form a single stator vibration body S in which the first stator 2 and the second stator 10 vibrate in the same vibration mode. Further, if it is possible to fix the second stator 10 to the first stator 2 while holding the rotor 6, a fixation means other than bolts, such as adhesion can be adopted. However, in order to form a single stator vibration body S, it is desirable to effect adhesion or the like utilizing the entire contact area of the first stator 2 and the second stator 10.

Figure 6:
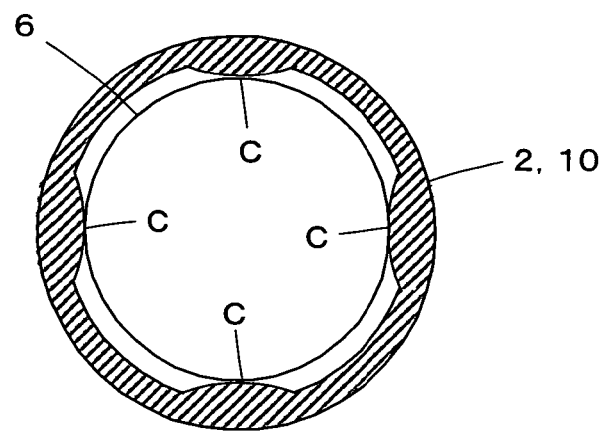
FIG. 6 is a plan sectional view showing the stator configuration in a modification of Embodiment 1.

Further, it is also possible to adopt a construction in which at least one of the step 9 of the first stator 2 and the corner 11 of the second stator 10 is not in contact with the rotor 6 over the entire periphery thereof but, as shown in FIG. 6, is in contact therewith solely at a plurality of, e.g., four, peripheral positions thereon. This makes it possible to achieve a reduction in frictional loss due to the contact of the rotor 6 with the first stator 2 and/or the second stator 10, thereby enabling to realize a still higher torque. In this case, it is desirable for the plurality of contact portions C on the first stator 2 or the second stator 10 held in contact with the surface of the rotor 6 to be at positions symmetrical with respect to the rotor 6.

Embodiment 2

Figure 7:
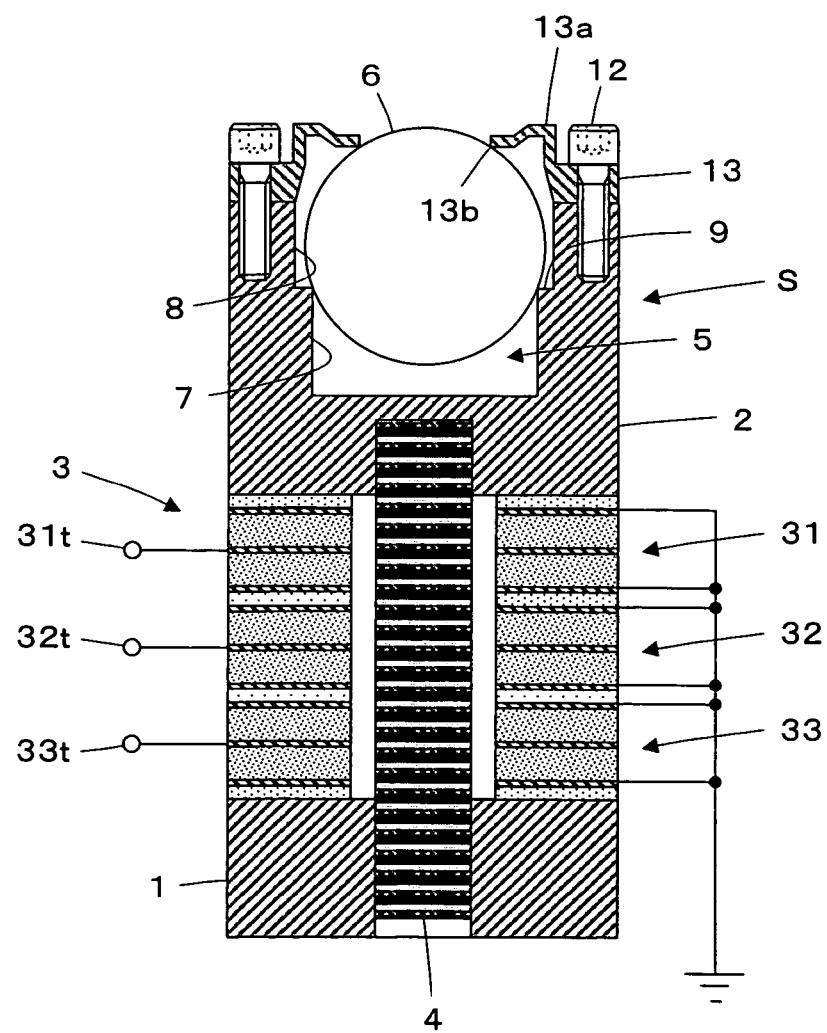
FIG. 7 is a sectional view showing an ultrasonic motor according to Embodiment 2.

FIG. 7 shows a multi-degree-of-freedom ultrasonic motor according to Embodiment 2 of the present invention. In this multi-degree-of-freedom ultrasonic motor, the multi-degree-of-freedom ultrasonic motor of Embodiment 1 shown in FIG. 1 is modified such that, instead of the second stator 2 having the annular corner 11 at the inner peripheral edge, there is used a second stator 13 having an annular plate spring 13a. The annular plate spring 13a has elasticity so as to hold the rotor 6, and an inner peripheral edge 13b of the plate spring 13a is situated in the XY-plane to be in contact with the surface of the rotor 6.

As in the multi-degree-of-freedom ultrasonic motor of Embodiment 1, the second stator 13 is firmly fixed to the first stator 2 by twelve fixation bolts 12, and the first stator 2 and the second stator 13 form a single stator vibration body S in which the first stator 2 and the second stator 13 vibrate in the same vibration mode.

In Embodiment 2 also, two terminals are selected from the first terminal 31t, the second terminal 32t, and the third terminal 33t of the vibrator 3, and AC voltages are respectively applied, whereby vibration is generated in the stator vibration body S, and the step 9 of the first stator 2 and the inner peripheral edge 13b of the plate spring 13a of the second stator 13, which are in contact with the rotor 6, vibrate in the same vibration mode, causing the rotor 6 to rotate with high torque.

At this time, the inner peripheral edge 13b of the plate spring 13a is elastically in contact with the surface of the rotor 6, so the frictional forces between the rotor 6 and both of the step 9 of the first stator 2 and the inner peripheral edge 13b of the plate spring 13a of the second stator 13 increase, resulting in an increase in the torque for the rotor 6.

Embodiment 3

Figure 8:
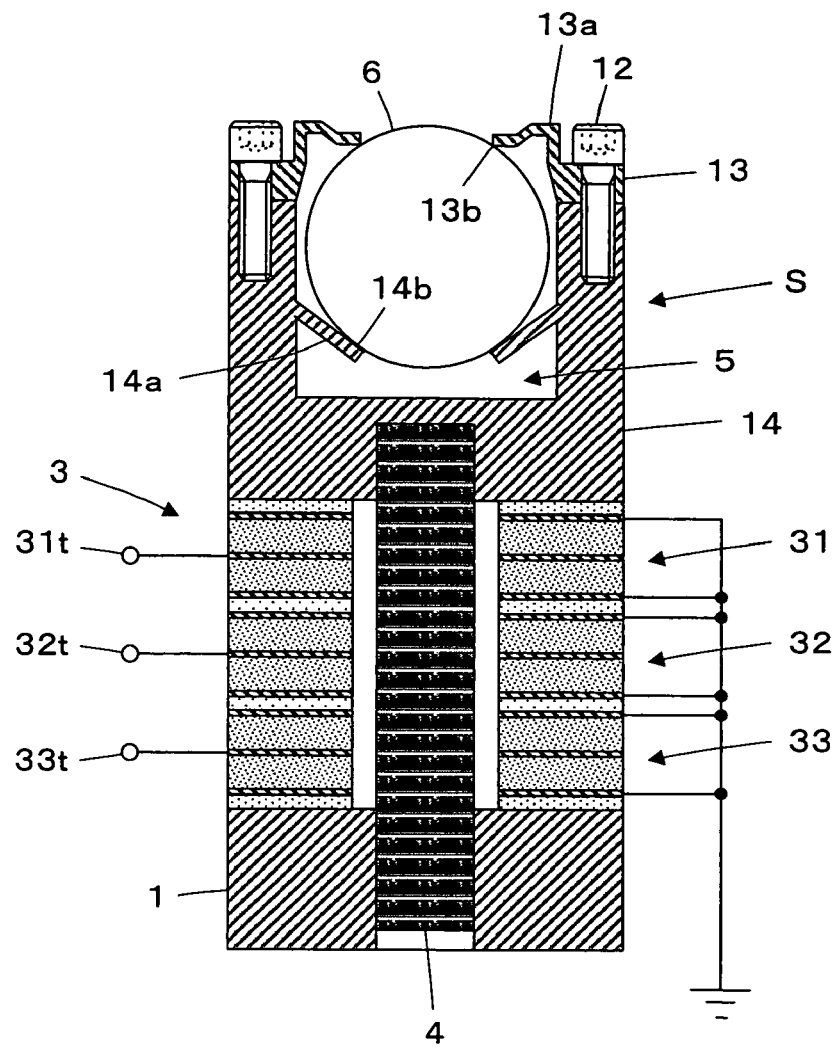
FIG. 8 is a sectional view showing an ultrasonic motor according to Embodiment 3.

FIG. 8 shows a multi-degree-of-freedom ultrasonic motor according to Embodiment 3 of the present invention. In this multi-degree-of-freedom ultrasonic motor, the multi-degree-of-freedom ultrasonic motor of Embodiment 2 shown in FIG. 7 is modified such that, instead of the first stator 2 having the annular step 9 in the recess 5, there is used a first stator 14 having an annular plate spring 14a in the recess 5. Both the plate spring 14a of the first stator 14 and the annular plate spring 13a of the second stator 13 have elasticity so as to hold the rotor 6, and an inner peripheral edge 13b of the plate spring 13a and the inner peripheral edge 14b of the plate spring 14a are situated in the XY-plane to be in contact with the surface of the rotor 6.

As in the multi-degree-of-freedom ultrasonic motors of Embodiments 1 and 2, the second stator 13 is firmly fixed to the first stator 14 by the twelve fixation bolts 12, and the first stator 14 and the second stator 13 form the single stator vibration body S in which the first stator 14 and the second stator 13 vibrate in the same vibration mode.

In Embodiment 3 also, two terminals are selected from the first terminal 31t, the second terminal 32t, and the third terminal 33t of the vibrator 3, and AC voltages are respectively applied, whereby vibration is generated in the stator vibration body S, and the inner peripheral edge of 14b of the plate spring 14a of the first stator 14 and the inner peripheral edge 13b of the plate spring 13a of the second stator 13, which are in contact with the rotor 6, vibrate in the same vibration mode, causing the rotor 6 to rotate with high torque.

At this time, the inner peripheral edge 14b of the plate spring 14a of the first stator 14 and the inner peripheral edge 13b of the plate spring 13a of the second stator 13 are elastically in contact with the surface of the rotor 6, so the frictional forces between the rotor 6 and both of the inner peripheral edge 14b of the plate spring 14a of the first stator 14 and the inner peripheral edge 13b of the plate spring 13a of the second stator 13 increase, resulting in an increase in the torque for the rotor 6.

Embodiment 4

Figure 9:
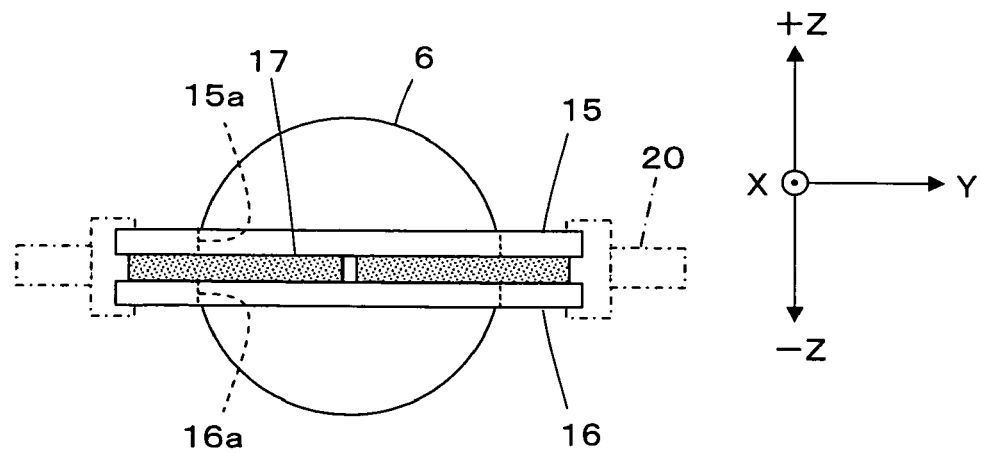
FIG. 9 is a side view showing an ultrasonic motor according to Embodiment 4.
Figure 10:
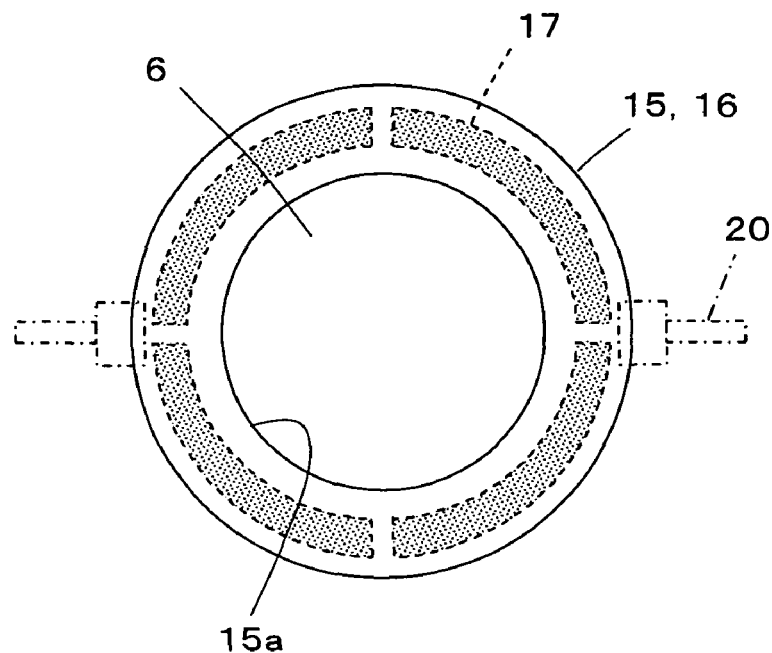
FIG. 10 is a plan view showing the ultrasonic motor of Embodiment 4.

FIGS. 9 and 10 show a multi-degree-of-freedom ultrasonic motor according to Embodiment 4 of the present invention. While in the multi-degree-of-freedom ultrasonic motors of Embodiments 1 to 3 the first stator 2 or 14 and the second stator 10 or 13 are respectively formed integrally by fixation bolts 12 and arranged on one side of the vibrator 3. In the multi-degree-of-freedom ultrasonic motor of Embodiment 4, a first stator 15 and a second stator 16 are arranged on both sides of a vibrator 17 with the vibrator 17 therebetween.

The first stator 15 and the second stator 16 exhibit a ring-like configuration so as to surround the rotor 6 in the circumferential direction in an annular fashion, and have circular openings 15a and 16a having an inner diameter slightly smaller than the diameter of the rotor 6. The rotor 6 is exposed in both the +Z-axis direction and the −Z-axis direction through the opening 15a of the first stator 15 and the opening 16a of the second stator 16, respectively.

Figure 11:
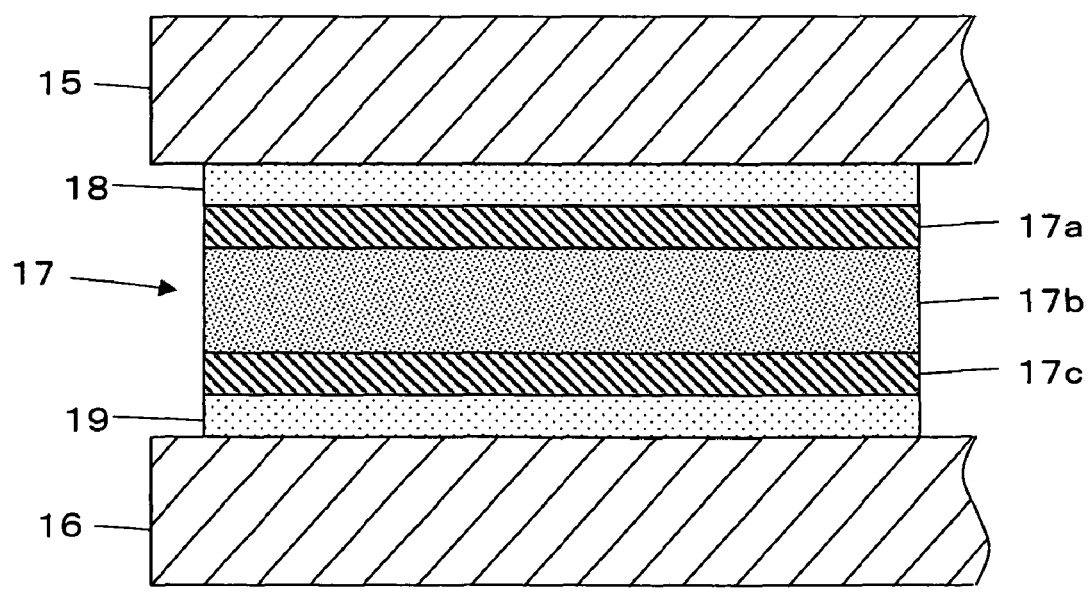
FIG. 11 is a partial sectional view showing the construction of a vibrator in Embodiment 4.

The vibrator 17 is circumferentially divided into four portions in the XY-plane and, as shown in FIG. 11, each portion has a structure in which an electrode plate 17a, a piezoelectric element plate 17b, and an electrode plate 17c are successively superimposed one upon the other. Each of the piezoelectric element plates 17b of the vibrator 17 divided into four is polarized so as to perform deformation behavior of expansion or contraction in the Z-axis direction (thickness direction). By applying an independent AC voltage between the electrode plates 17a and the 17c, the four divisional portions of the vibrator 17 can be drive-controlled independently of each other. The vibrator 17 is arranged while insulated from the first stator 15 and the second stator 16 through insulating sheets 18 and 19.

By drive-controlling the four divisional portions of the vibrator 17 independently of each other, elliptical vibration in a desired plane is generated at the peripheral edge portion of the opening 15a of the first stator 15 and the peripheral edge portion of the opening 16a of the second stator 16, which are held in contact with the rotor 6, for enabling them to vibrate in the same vibration mode, mapproximateg it possible to rotate the rotor 6 with high torque.

By supporting the first stator 15 and the second stator 16 by fixing members 20 at the positions of nodes formed when the first stator 15 and the second stator 16 are caused to vibrate by the vibrator 17, it is possible to support the multi-degree-of-freedom ultrasonic motor of Embodiment 4 while minimizing the influence on the vibration of the first stator 15 and the second stator 16.

For example, by mounting an arm, an image pick-up device or the like to the surface portions of the rotor 6 exposed in the +Z-axis direction and the −Z-axis direction through the opening 15a of the stator 15 and the opening 16a of the second stator 16, respectively, it is possible to realize a multi-degree-of-freedom actuator having a plurality of arms, a camera intended for a very wide field range or the like.

While in Embodiments 1 to 4 AC voltages whose phases are shifted by 90 degrees are applied through two terminals selected from the first terminal 31t, the second terminal 32t, and the third terminal 33t of the vibrator 3, the angle by which the phases are shifted is not restricted to 90 degrees but allows variation. Further, the voltage values of the AC voltages applied may be varied. By variously controlling the AC voltages, it is possible to control the elliptical vibrations generated in the first stator 2, 14, 15 and the second stator 10, 13, 16.

Further, while in Embodiments 1 to 4 the contact of the first stator 2, 15 and the second stator 10, 16 with the rotor 6 is effected at corner portions such as the step 9 and the corner 11, this should not be construed restrictively. As long as transmission of elliptical motion is possible, contact can be adopted through a flat surface or a curved surface, and the manner of contact may be other than the annular one.

While in Embodiments 1 to 4 there is used a vibrator 3 which generates, as vibrations in three directions different from each other, longitudinal vibration in the Z-direction and flexural vibrations in the X and Y-directions, the vibrations may also be ones which are not thus orthogonal to each other. Further, while the vibrator generating vibrations in three directions uses piezoelectric elements corresponding to their respective directions, such as the first piezoelectric element portion 31, the second piezoelectric element portion 32, and the third piezoelectric element portion 33, it is also possible to synthesize vibrations of a plurality of piezoelectric element portions to generate the vibrations in the different directions, or to polarize one piezoelectric element portion into three or more to generate vibrations in two or more directions with a single piezoelectric element portion.

Further, while in Embodiments 1 to 4 two directions are selected from three directions to generate vibrations, it is also possible to apply AC voltage to all the piezoelectric elements corresponding to the three directions to generate a synthetic vibration under control of the phase and amplitude of the vibration in each direction.

Embodiment 5

Figure 12:
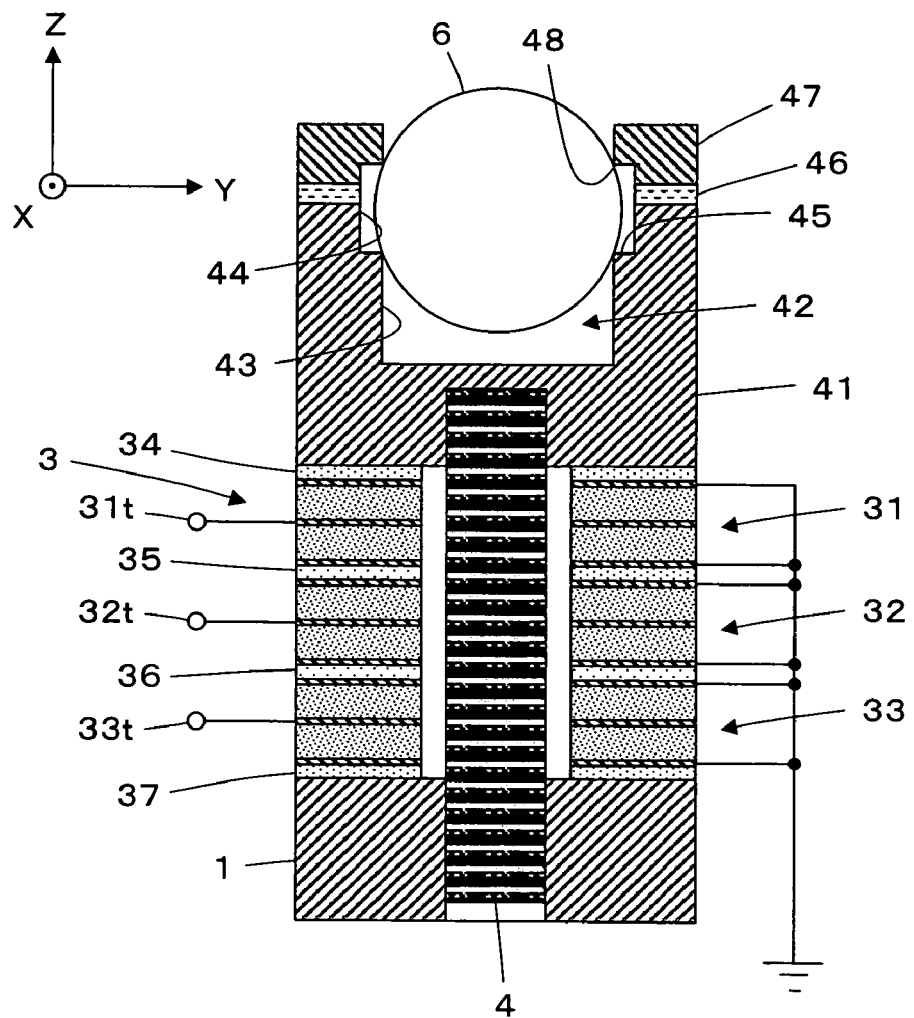
FIG. 12 is a sectional view showing an ultrasonic motor according to Embodiment 5.
Figure 13:
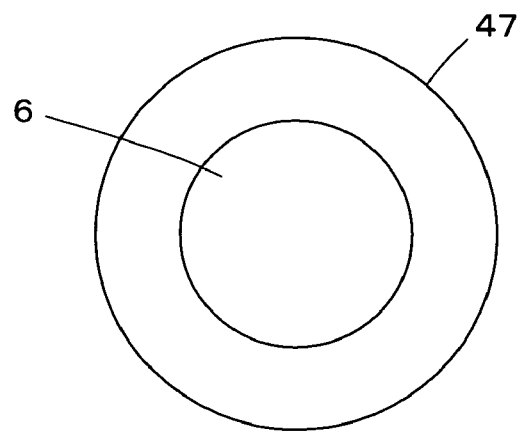
FIG. 13 is a plan view showing the ultrasonic motor of Embodiment 5.

FIGS. 12 and 13 show an ultrasonic motor according to Embodiment 5 of the present invention. The cylindrical vibrator 3 constituting the stator vibrating means is held between the base block 1 and a stator 41, and the base block 1 and the stator 41 are connected to each other by the connection bolt 4 passed through the vibrator 3, with the ultrasonic motor as a whole exhibiting a substantially columnar outward appearance. Here, for the sake of convenience in illustration, the central axis of the columnar outer configuration extending from the base block 1 toward the stator 41 will be referred to as Z-axis; the X-axis extends perpendicularly to the Z-axis, and the Y-axis extends perpendicularly to the Z-axis and the X-axis.

The vibrator 3 has the first to third flat-plate-like piezoelectric element portions 31 to 33 situated in the XY-plane and superimposed one upon the other; the piezoelectric element portions 31 to 33 are arranged while insulated from the stator 41 and the base block 1 and from each other through the insulation sheets 34 to 37.

The stator 41 has a recess 42 on the side opposite to the surface in contact with the vibrator 3, and the spherical rotor 6 is accommodated in the recess 42. The recess 42 includes a small diameter portion 43 whose inner diameter is smaller than the diameter of the rotor 6 and a large diameter portion 44 whose inner diameter is larger than the diameter of the rotor 6. At the boundary portion between the small diameter portion 43 and the large diameter portion 44, there is formed an annular step 45 situated in the XY-plane.

Further, a ring-like preload member 47 is elastically connected to the top portion of the stator 41 through an annular plate spring 46 so as to be adjacent thereto in the Z-axis direction. At the inner peripheral edge of the preload member 47, there is formed an annular corner 48 situated in the XY-plane, and the rotor 6 is held and rotatably supported while in contact with both the step 45 of the stator 41 and the corner 48 of the preload member 47.

Here, the preload member 47 is urged in the direction of the stator 41 by the plate spring 46, and a preload acts on the rotor 6 through the corner 48 of the preload member 47.

Further, due to the presence of the plate spring 46 between the stator 41 and the preload member 47, when vibration is generated in the stator 41 by the vibrator 3, the preload member 47 vibrates in a vibration mode different from the vibration mode of the stator 41.

For example, the base block 1, the stator 41, and the preload member 47 are formed of duralumin, and the ultrasonic motor as a whole is formed as a substantially columnar body having a diameter of 40 mm and a height of approximately 100 mm. A steel ball having a diameter of 25.8 mm is used as the rotor 6.

Here, as in the case of the vibrator 3, the portions indicated by the same reference numerals as those of Embodiment 1 are of the same construction as those of Embodiment 1.

Next, the operation of the ultrasonic motor of Embodiment 5 will be described.

First, when an AC voltage of a frequency approximate to the natural frequency of the stator 41 is applied through the first terminal 31t to the vibrator 3, the portions of the pair of piezoelectric element plates 31b and 31d of the first piezoelectric element portion 31 divided into two alternately repeat expansion and contraction in the Z-axis direction, and flexural vibration in the Y-axis direction is generated in the stator 41. When an AC voltage of a frequency approximate to the natural frequency of the stator 41 is applied through the second terminal 32t, the pair of piezoelectric element plates 32b and 32d of the second piezoelectric element portion 32 repeat expansion and contraction in the Z-axis direction, and longitudinal vibration in the Z-axis direction is generated in the stator 41. When an AC voltage of a frequency approximate to the natural frequency of the stator 41 is applied through the third terminal 33t, the portions of the pair of piezoelectric element plates 33b and 33d of the third piezoelectric element portion 33 divided into two alternately repeat expansion and contraction in the Z-axis direction, and flexural vibration in the X-axis direction is generated in the stator 41.

Thus, when AC voltages whose phases are shifted by 90 degrees relative to each other are respectively applied through both the first terminal 31t and the second terminal 32t, flexural vibration in the Y-axis direction and longitudinal vibration in the Z-axis direction are combined, and elliptical vibration in the YZ-plane is generated at the step 45 of the stator 41, which is in contact with the rotor 6, with the result that the rotor 6 rotates around the X-axis due to frictional force.

Similarly, when AC voltages whose phases are shifted by 90 degrees relative to each other are respectively applied through both the second terminal 32t and the third terminal 33t, flexural vibration in the X-axis direction and longitudinal vibration in the Z-axis direction are combined, and elliptical vibration in the XZ-plane is generated at the step 45 of the stator 41, which is in contact with the rotor 6, with the result that the rotor 6 rotates around the Y-axis due to frictional force.

Further, when AC voltages whose phases are shifted by 90 degrees relative to each other are respectively applied through both the first terminal 31t and the third terminal 33t, flexural vibration in the X-axis direction and flexural vibration in the Y-axis direction are combined, and elliptical vibration in the XY-plane is generated at the step 45 of the stator 41, which is in contact with the rotor 6, with the result that the rotor 6 rotates around the Z-axis due to frictional force.

Figure 14:
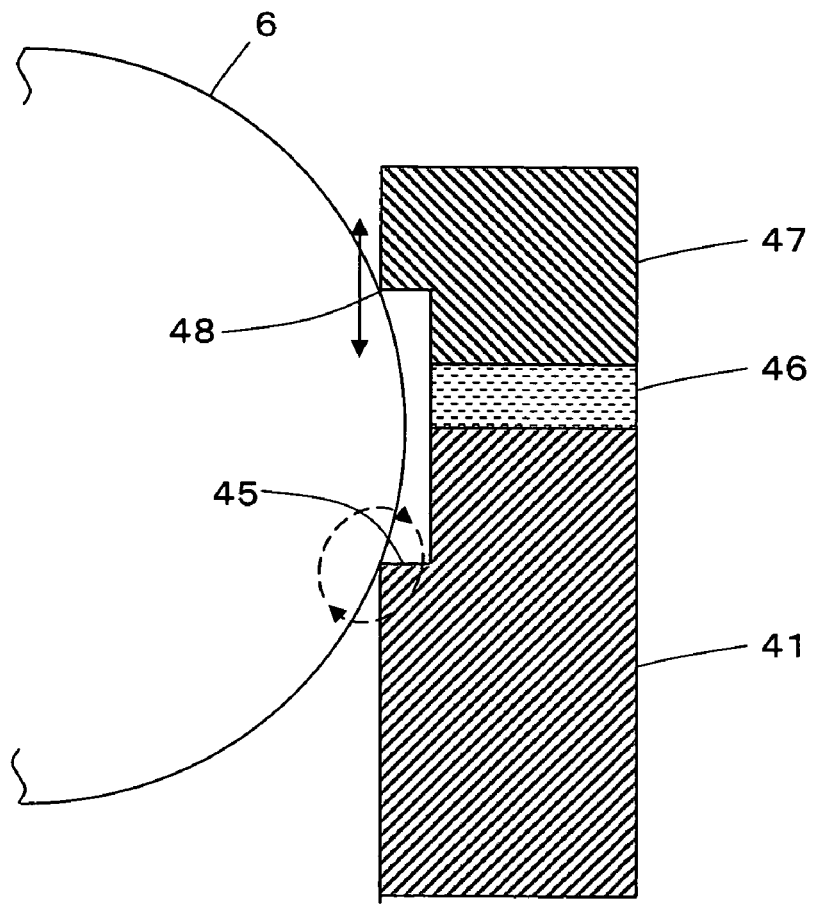
FIG. 14 is a partial enlarged sectional view showing the ultrasonic motor of Embodiment 5.

In this way, when two terminals are selected from the first terminal 31t, the second terminal 32t, and the third terminal 33t of the vibrator 3, and AC voltages whose phases are shifted by 90 degrees relative to each other are respectively applied through both of those two terminals, vibration is generated in the stator 41 and, as indicated by the arrow dashed line of FIG. 14, elliptical vibration in a plane corresponding to the selected two terminals is generated at the step 45 of the stator 41, which is in contact with the rotor 6.

Here, a preload acts on the rotor 6 through the corner 48 of the preload member 47 by the urging force of the plate spring 46, and the rotor 6 is pressed against the step 45 of the stator 41, so rotational force is transmitted to the rotor 6 due to the frictional force between the rotor 6 and the step 45.

At this time, due to the plate spring 46 provided between the preload member 47 and the stator 41, the preload member 47 vibrates in a vibration mode different from the vibration mode of the stator 41 as indicated by the arrow solid line of FIG. 14, so the frictional loss due to the contact of the corner 48 of the preload member 47 with the surface of the rotor 6 is substantially reduced, and the rotor 6 rotates with high torque.

Further, the preload member 47 is connected to the stator 41 through the plate spring 46, and the preload member 47 is caused to vibrate by utilizing the vibration of the stator 41 due to the vibrator 3, so it is possible to obtain an ultrasonic motor of a simple construction.

When the vibrator 3 is at rest and the preload member 47 does not vibrate, the frictional force between the corner 48 of the preload member 47 and the surface of the rotor 6 increases, whereby it is possible to hold the rotor 6.

Thus, by mounting an arm, an image pick-up device or the like (not shown) to the surface portion of the rotor 6 exposed through the ring-shaped preload member 47, it is possible to realize a multiple-degree-of-freedom actuator, a camera for a wide field range or the like.

Figure 15:
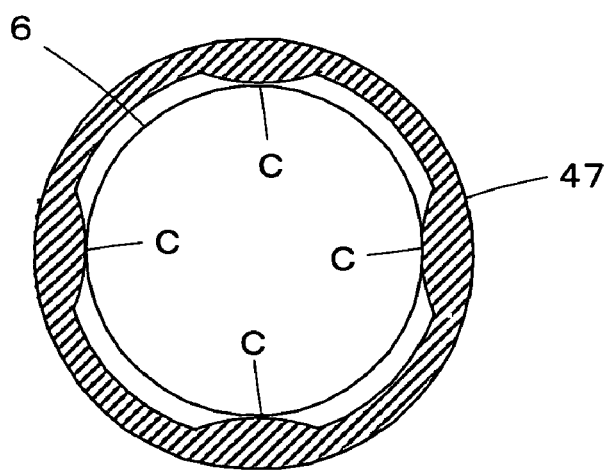
FIG. 15 is a plan sectional view showing the configuration of a preload member in a modification of Embodiment 5.

Further, it is also possible to adopt a construction in which the corner 48 of the ring-shaped preload member 47 is not in contact with the rotor 6 over the entire periphery thereof but, as shown in FIG. 15, held in contact therewith solely at a plurality of, e.g., four, peripheral positions thereon. This makes it possible to achieve a reduction in frictional loss due to the contact of the preload member 47 and the rotor 6, thereby enabling to realize a still higher torque. In this case, it is desirable for the plurality of contact portions C on the preload member 47 held in contact with the surface of the rotor 6 to be at positions symmetrical with respect to the rotor 6.

Embodiment 6

Figure 16:
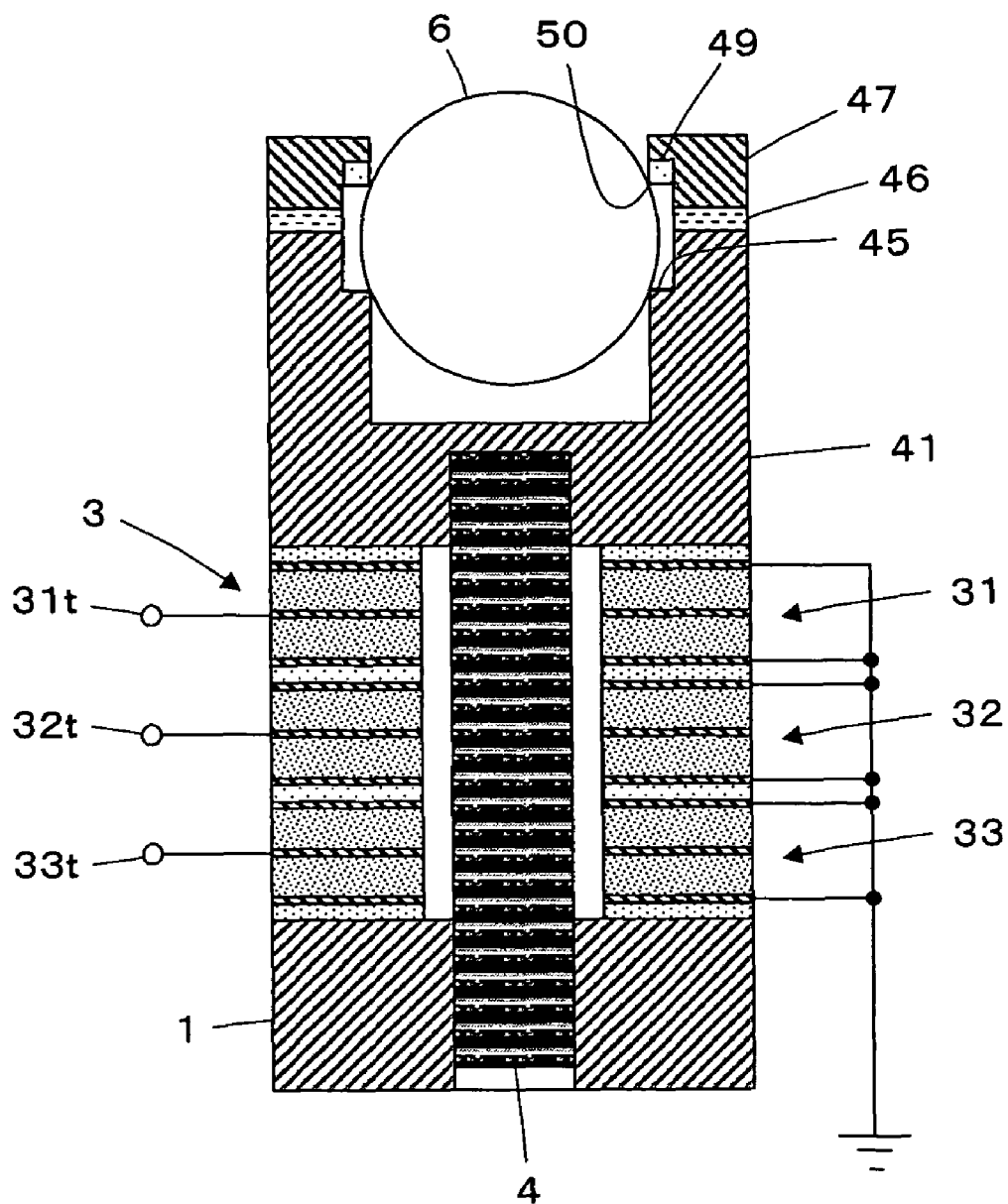
FIG. 16 is a sectional view showing an ultrasonic motor according to Embodiment 6.

FIG. 16 shows an ultrasonic motor according to Embodiment 6 of the present invention. In this ultrasonic motor, the ultrasonic motor of Embodiment 5 shown in FIG. 12 is modified such that an annular contact member 49 situated in the XY-plane is mounted to the inner peripheral edge of the ring-shaped preload member 47. The contact member 49 is formed of a low friction member such as Teflon (registered trademark), and the rotor 6 is held in contact with both a corner 40 formed by the contact member 50 and the step 45 of the stator 41 and is rotatably supported.

Since a preload is applied to the rotor 6 via the contact member 49 formed of a low friction member, so the frictional loss due to the contact of the contact member 49 and the rotor 6 is further reduced, and an ultrasonic motor of high torque is realized.

Embodiment 7

Figure 17:
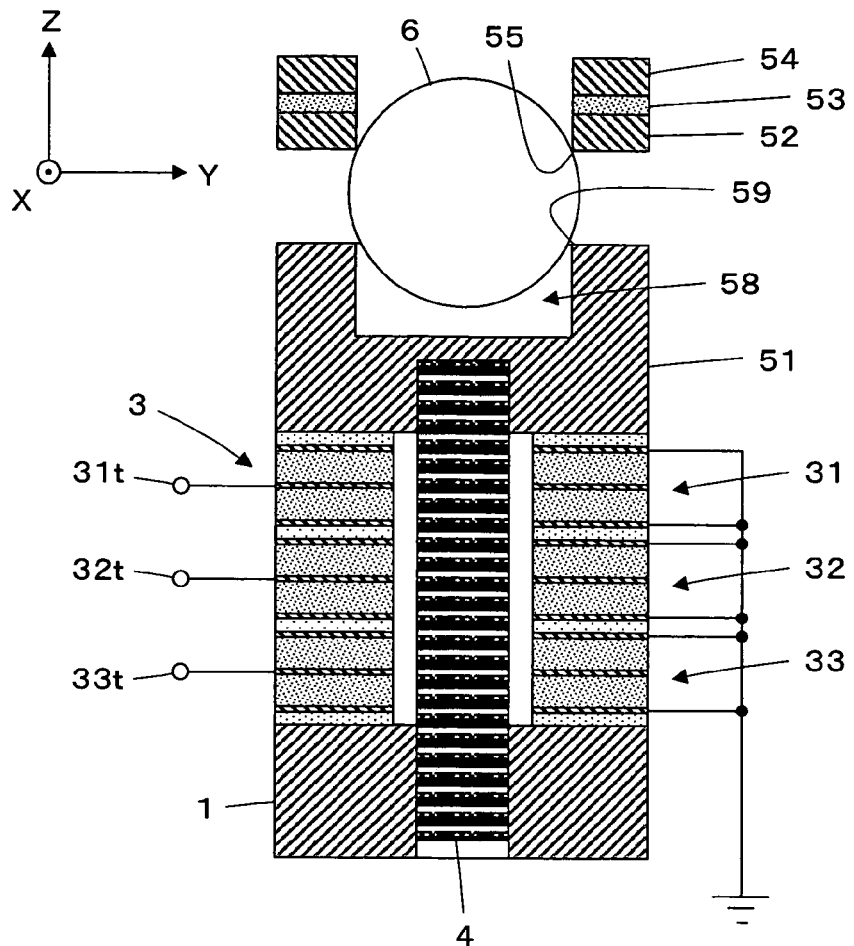
FIG. 17 is a sectional view showing an ultrasonic motor according to Embodiment 7.

FIG. 17 shows an ultrasonic motor according to Embodiment 7 of the present invention. In this ultrasonic motor, the ultrasonic motor of Embodiment 5 shown in FIG. 12 is modified so that, instead of the preload member 47 elastically connected to the stator 41 through the plate spring 46, a preload member 52 is arranged so as to be spaced apart from a stator 51 in the Z-axis direction. A holding member 54 is connected to the preload member 52 through a vibrator 53, and the holding member 54 is elastically supported by a spring or the like (not shown) with respect to the stator 51 or the base block 1 so as to be urged in the direction of the stator 51.

Each of the preload member 52, the vibrator 53, and the holding member 54 is formed in a ring-like configuration having an opening at the center, and the rotor 6 is exposed through those openings. Further, an annular corner 55 situated in the XY-plane is formed at the inner peripheral edge of the preload member 52.

Figure 18:
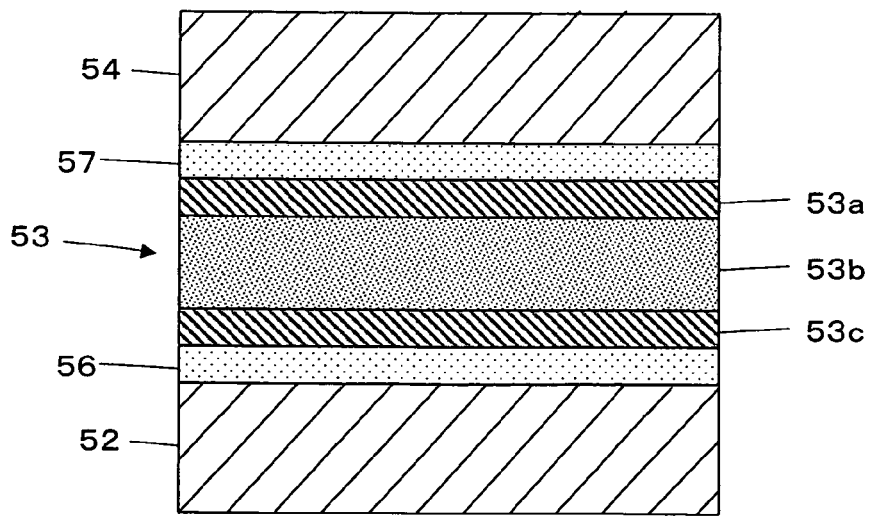
FIG. 18 is a partial sectional view showing the construction of a vibrator used in Embodiment 7.

As shown in FIG. 18, the vibrator 53 has a construction in which an electrode plate 53a, a piezoelectric element plate 53b, and an electrode plate 53c are successively superimposed one upon the other. The piezoelectric element plate 53b is polarized so as to perform a deformation behavior of expansion or contraction in the thickness direction thereof. By applying AC voltage between the electrode plates 53a and 53c, it is possible to drive-control the vibrator 53. Insulating sheets 56 and 57 are arranged respectively on both sides of the vibrator 53, and the vibrator 53 is arranged while insulated from the preload member 52 and the holding member 54 through the insulation sheets 56 and 57.

As in the case of the stator 41 of Embodiment 5, the stator 51 is connected with the base block 1 by the connection bolt 4 while holding the vibrator 3 therebetween. On the side of the stator 51 opposite to the surface in contact with the vibrator 3, there is formed a recess 58 having an inner diameter smaller than the diameter of the rotor 6. An annular corner 59 situated in the XY-plane is formed at the peripheral edge of the open end of the recess 58, and the rotor 6 is held rotatably while in contact with both a corner 59 of the stator 51 and the corner 55 of the preload member 52.

In this construction also, when AC voltages whose phases are shifted by 90 degrees relative to each other are respectively applied through two terminals selected from the first terminal 31t, the second terminal 32t, and the third terminal 33t of the vibrator 3, vibration is generated in the stator 51, and elliptical vibration in a plane corresponding to the two terminals selected is generated at the corner 59 of the stator 51 in contact with the rotor 6.

At this time, the holding member 54 is urged in the direction of the stator 51 by a spring or the like (not shown), and a preload is applied to the rotor 6 via the corner 55 of the preload member 52, pressurizing the rotor 6 with respect to the corner 59 of the stator 51, so rotational force is transmitted to the rotor 6 by the frictional force between the rotor 6 and the corner 59.

Here, when the vibrator 53 is drive-controlled, the preload member 52 vibrates independently of the vibration of the stator 51 due to the vibrator 3, whereby the frictional loss due to the contact of the corner 55 of the preload member 52 with the surface of the rotor 6 is substantially reduced, and the rotor 6 rotates with high torque.

Figure 19:
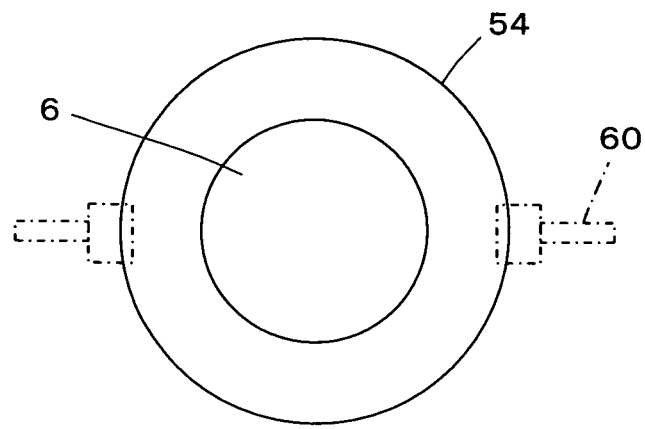
FIG. 19 is a plan view showing an ultrasonic motor according to a modification of Embodiment 7.

As shown in FIG. 19, by supporting the preload member 52 and the holding member 54 by fixing members 60 at the positions of nodes formed when the preload member 52 and the holding member 54 are caused to vibrate by the vibrator 53, it is possible to support the preload member 52 while minimizing the influence of the preload member 52 on the vibration.

Embodiment 8

Figure 20:
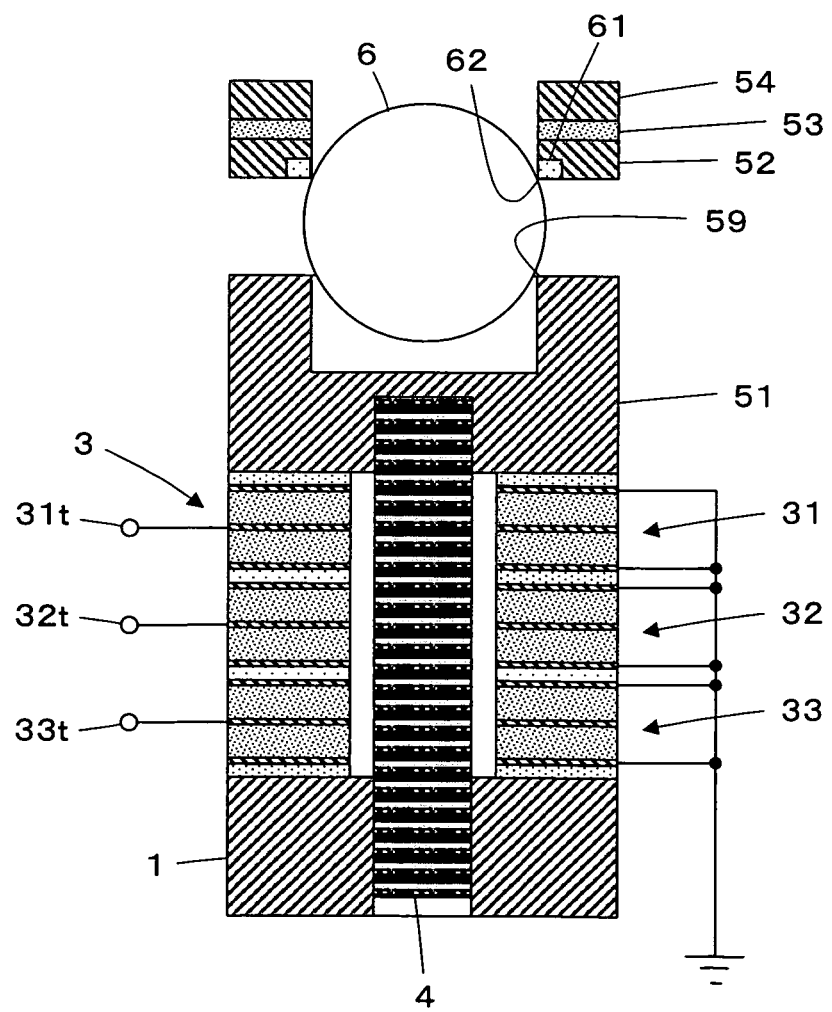
FIG. 20 is a sectional view showing an ultrasonic motor according to Embodiment 8.

FIG. 20 shows an ultrasonic motor according to Embodiment 8 of the present invention. In this ultrasonic motor, the ultrasonic motor of Embodiment 7 shown in FIG. 17 is modified such that an annular contact member 61 situated in the XY-plane is mounted to the inner peripheral edge of the ring-shaped preload member 52. The contact member 61 is formed of a low friction member such as Teflon (registered trademark), and the rotor 6 is held in contact with both a corner 62 formed by the contact member 61 and the step 59 of the stator 51 and is rotatably supported.

Since a preload is applied to the rotor 6 via the contact member 61 formed of a low friction member, so the frictional loss due to the contact of the contact member 61 and the rotor 6 is further reduced, and an ultrasonic motor of high torque is realized.

While Embodiments 5 to 8 are applied to a multi-degree-of-freedom ultrasonic motor in which the rotor 6 is spherical and is caused to rotate around a plurality of axes through vibration of the stators 41 and 51 by the vibrator 3, those embodiments may also be applied to a one-degree-of-freedom ultrasonic motor in which the rotor is rotated around a single axis.

While in Embodiments 5 to 8 AC voltages whose phases are shifted by 90 degrees are applied through two terminals selected from the first terminal 31t, the second terminal 32t, and the third terminal 33t of the vibrator 3, the angle by which the phases are shifted is not restricted to 90 degrees but allows variation. Further, the voltage values of the AC voltages applied may be varied. By variously controlling the AC voltages, it is possible to control the elliptical vibrations generated in the stator 41, 51.

Further, while in Embodiments 5 to 8 the contact of the stator 41, 51 with the rotor 6 is effected at corner portions such as the step 45 and the corner 59, this should not be construed restrictively. As long as transmission of elliptical motion is possible, contact can be adopted through a flat surface or a curved surface, and the manner of contact may be other than the annular one.

While in Embodiments 5 to 8 there is used a vibrator 3 which generates, as vibrations in three directions different from each other, longitudinal vibration in the Z-direction and flexural vibrations in the X and Y-directions, the vibrations may also be ones which are not thus orthogonal to each other. Further, while the vibrator generating vibrations in three directions uses piezoelectric elements corresponding to their respective directions, such as the first piezoelectric element portion 31, the second piezoelectric element portion 32, and the third piezoelectric element portion 33, it is also possible to synthesize vibrations of a plurality of piezoelectric element portions to generate the vibrations in the different directions, or to polarize one piezoelectric element portion into three or more to generate vibrations in two or more directions with a single piezoelectric element portion.

Further, while in Embodiments mentioned above two directions are selected from three directions to generate vibrations, it is also possible to apply AC voltage to all the piezoelectric elements corresponding to the three directions to generate a synthetic vibration under control of the phase and amplitude of the vibration in each direction.

Embodiment 9

Figure 21:
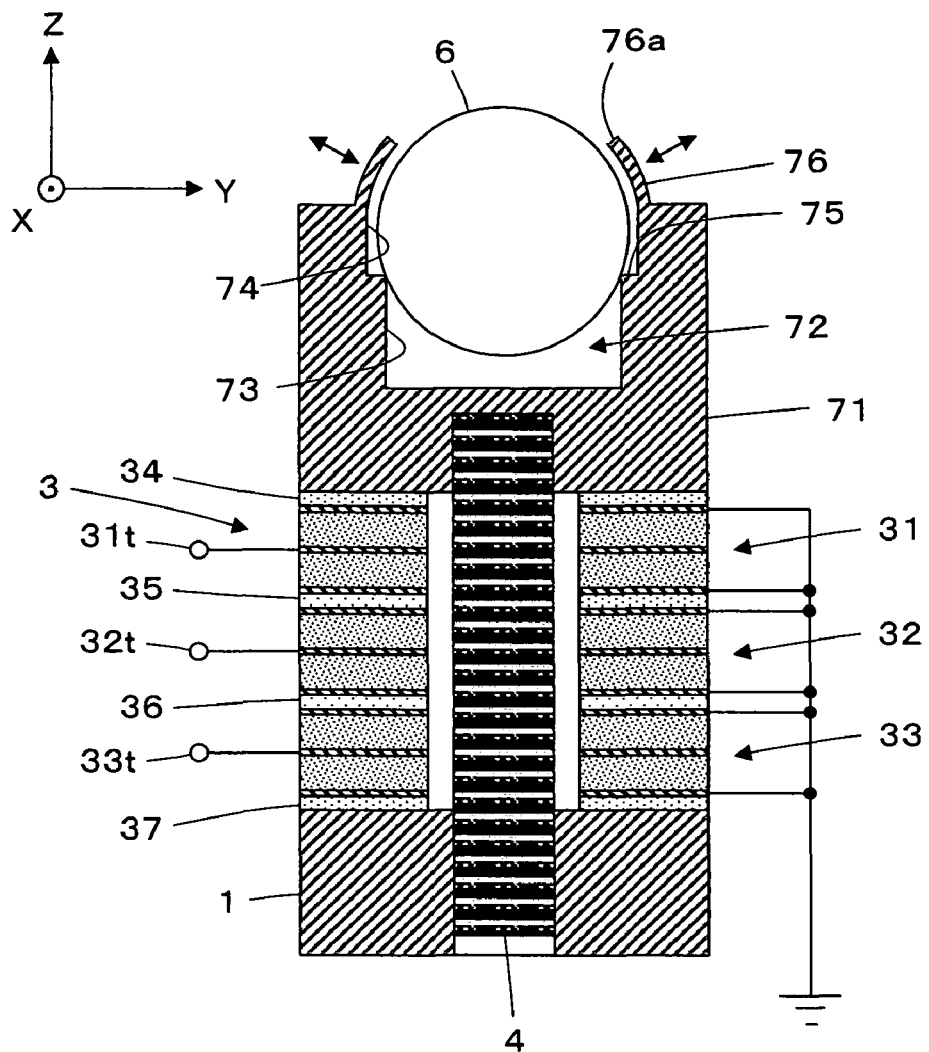
FIG. 21 is a sectional view showing an ultrasonic motor according to Embodiment 9 of the present invention.
Figure 22:
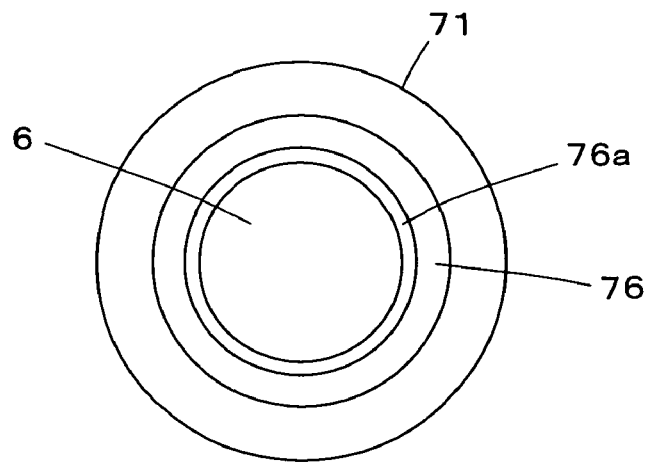
FIG. 22 is a plan view showing the ultrasonic motor of Embodiment 9.

FIGS. 21 and 22 show a multiple-degree-of-freedom ultrasonic motor according to Embodiment 9 of the present invention. The cylindrical vibrator 3 constituting the stator vibrating means is held between the base block 1 and a stator 71, and the base block 1 and the stator 71 are connected to each other by the connection bolt 4 passed through the vibrator 3, with the multiple-degree-of-freedom ultrasonic motor as a whole exhibiting a substantially columnar outward appearance. Here, for the sake of convenience in illustration, the central axis of the columnar outer configuration extending from the base block 1 toward the stator 71 will be referred to as Z-axis; the X-axis extends perpendicularly to the Z-axis, and the Y-axis extends perpendicularly to the Z-axis and the X-axis.

The vibrator 3 has the first to third flat-plate-like piezoelectric element portions 31 to 33 situated in the XY-plane and superimposed one upon the other; the piezoelectric element portions 31 to 33 are arranged while insulated from the stator 71 and the base block 1 and from each other through the insulation sheets 34 to 37.

The stator 71 has a recess 72 on the side opposite to the surface in contact with the vibrator 3, and the spherical rotor 6 is accommodated in the recess 72. The recess 72 includes a small diameter portion 73 whose inner diameter is smaller than the diameter of the rotor 6 and a large diameter portion 74 whose inner diameter is larger than the diameter of the rotor 6. At the boundary portion between the small diameter portion 73 and the large diameter portion 74, there is formed an annular step 75 situated in the XY-plane. The rotor 6 is rotatably supported by being held in contact with the step 75 in the recess 72. Further, the stator 71 has an annular ring member 76 formed so as to protrude substantially in the Z-axis direction from the opening peripheral edge of the recess 72. The ring member 76 is arranged so as to surround the rotor 6 circumferentially, that is, circumferentially in a section taken along an XY-plane, and a part of the rotor 6 is exposed from a distal end portion 76a of the ring member 76. The inner surface of the ring member 76 is in close proximity and opposed to the surface of the rotor 6.

Figure 23:
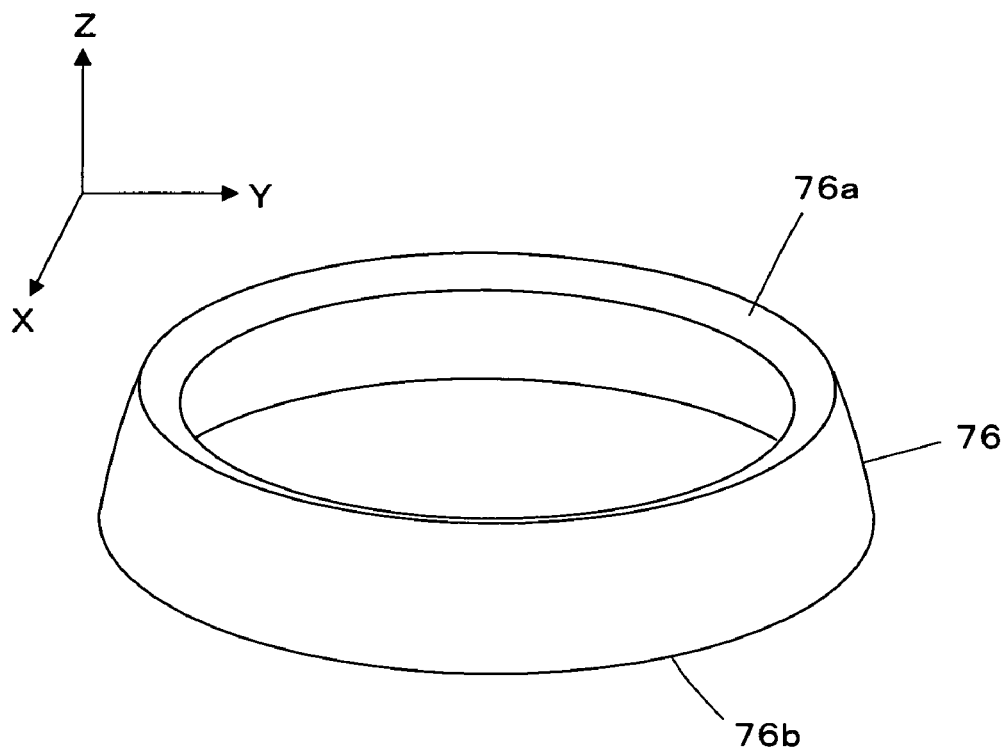
FIG. 23 is a perspective view showing the configuration of a ring member of Embodiment 9.
Figure 24:
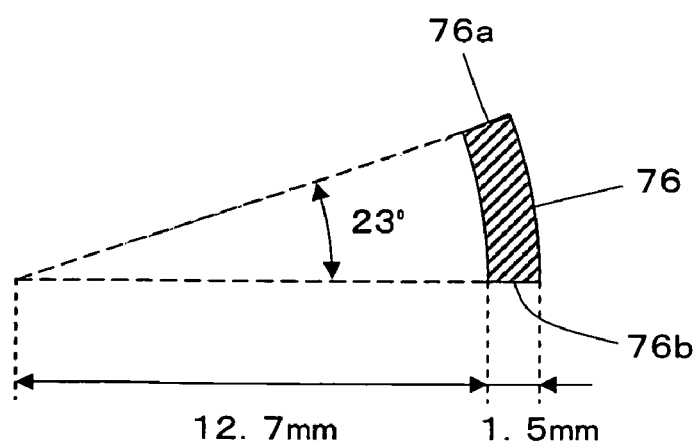
FIG. 24 is a partial sectional view showing the ring member of Embodiment 9.

As shown in FIG. 23, the ring member 76 is formed so as to be gradually diminished in diameter as it extends from a base portion 76b situated at the opening peripheral edge portion of the recess 72 toward the distal end portion 76a, that is, as it extends in the Z-axis direction. Further, as shown in FIG. 24, the ring member 76 has an arcuate sectional configuration curved in correspondence with the configuration of the surface of the rotor 6, that is, a spherical configuration.

For example, the base block 1 and the stator 71 are formed of duralumin, and the multi-degree-of-freedom ultrasonic motor as a whole is formed as a substantially columnar body having a diameter of 40 mm and a height of approximately 100 mm. A steel ball having a diameter of 25.8 mm is used as the rotor 6, and the ring member 76 of the stator 71 has an inner diameter of 25.4 mm and a thickness of 1.5 mm, with its inner surface being raised so as to draw an arc of a radius of curvature of 12.7 mm and an angle of 23 degrees.

Here, as in the case of the vibrator 3, the portions indicated by the same reference numerals as those of Embodiment 1 are of the same construction as those of Embodiment 1.

Next, the operation of the multi-degree-of-freedom ultrasonic motor of Embodiment 9 will be described.

First, when an AC voltage of a frequency approximate to the natural frequency of the stator 71 is applied through the first terminal 31t to the vibrator 3, the portions of the pair of piezoelectric element plates 31b and 31d of the first piezoelectric element portion 31 divided into two alternately repeat expansion and contraction in the Z-axis direction, and flexural vibration in the Y-axis direction is generated in the stator 71. When an AC voltage of a frequency approximate to the natural frequency of the stator 71 is applied through the second terminal 32t, the pair of piezoelectric element plates 32b and 32d of the second piezoelectric element portion 32 repeat expansion and contraction in the Z-axis direction, and longitudinal vibration in the Z-axis direction is generated in the stator 71. When an AC voltage of a frequency approximate to the natural frequency of the stator 71 is applied through the third terminal 33t, the portions of the pair of piezoelectric element plates 33b and 33d of the third piezoelectric element portion 33 divided into two alternately repeat expansion and contraction in the Z-axis direction, and flexural vibration in the X-axis direction is generated in the stator 71.

Thus, when AC voltages whose phases are shifted by 90 degrees relative to each other are respectively applied through both the first terminal 31t and the second terminal 32t, flexural vibration in the Y-axis direction and longitudinal vibration in the Z-axis direction are combined, and elliptical vibration in the YZ-plane is generated at the step 75 of the stator 71, which is in contact with the rotor 6, with the result that the rotor 6 rotates around the X-axis due to frictional force.

Similarly, when AC voltages whose phases are shifted by 90 degrees relative to each other are respectively applied through both the second terminal 32t and the third terminal 33t, flexural vibration in the X-axis direction and longitudinal vibration in the Z-axis direction are combined, and elliptical vibration in the XZ-plane is generated at the step 75 of the stator 71, which is in contact with the rotor 6, with the result that the rotor 6 rotates around the Y-axis due to frictional force.

Further, when AC voltages whose phases are shifted by 90 degrees relative to each other are respectively applied through both the first terminal 31t and the third terminal 33t, flexural vibration in the X-axis direction and flexural vibration in the Y-axis direction are combined, and elliptical vibration in the XY-plane is generated at the step 75 of the stator 71, which is in contact with the rotor 6, with the result that the rotor 6 rotates around the Z-axis due to frictional force.

Figure 25:
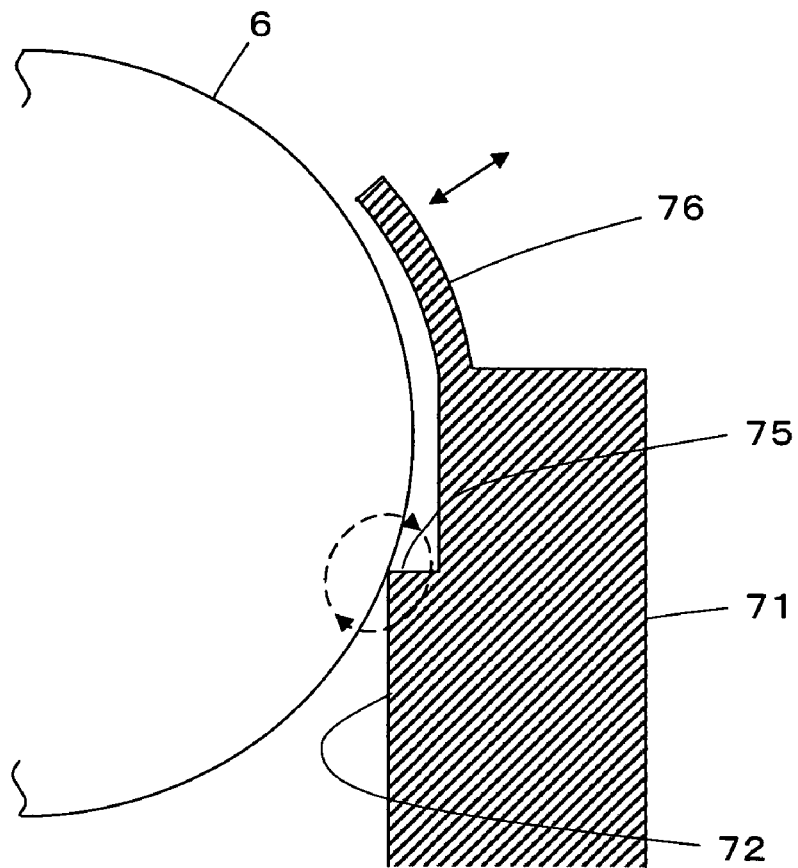
FIG. 25 is a partial enlarged sectional view showing the ultrasonic motor of Embodiment 9.

In this way, when two terminals are selected from the first terminal 31t, the second terminal 32t, and the third terminal 33t of the vibrator 3, and AC voltages whose phases are shifted by 90 degrees relative to each other are respectively applied through both of those two terminals, vibration is generated in the stator 71 and, as indicated by the arrow dashed line of FIG. 25, elliptical vibration in a plane corresponding to the selected two terminals is generated at the step 75 of the stator 71, which is in contact with the rotor 6.

Here, the stator 71 has the ring member 76 formed integrally therewith, so, as the stator 71 vibrates, the ring member 76 also vibrates while out of contact with the rotor 6 as indicated by the solid arrow line in FIG. 25. Consequently, due to the radiation pressure of sound wave radiated from the ring member 76, the rotor 6 is pressurized against the step 75 of the stator 71. As a result, the frictional force between the rotor 6 and the step 75 increases, and rotational force is effectively transmitted to the rotor 6.

As stated above, due to the ring member 76, it is possible to apply a preload to the rotor 6 in a non-contact state, so no frictional loss is generated between the ring member 76 and the surface of the rotor 6, whereby it is possible to realize a multi-degree-of-freedom ultrasonic motor of high torque and high efficiency.

Further, since the ring member 76 and the rotor 6 are not brought into contact with each other, noise or the like is not generated.

Further, the ring member 76 is provided integrally with the stator 71, and the ring member 76 is caused to vibrate by utilizing the vibration of the stator 71 due to the vibrator 3, so it is possible to obtain a multi-degree-of-freedom ultrasonic motor of a simple construction.

Further, solely by applying voltages to two terminals selected from the three terminals 31*t*, 32*t*, and 33*t* of the vibrator 3, the stator 71 vibrates to generate an elliptical motion for rotating the rotor 6 at the step 75, and a preload is applied to the rotor 6 by the ring member 76 in a non-contact state, making it possible to rotate the rotor 6 at multiple degrees of freedom.

It is also possible to apply a preload to the rotor 6 by using, air, electrostatic force, electromagnetic force or the like. In the case of air, however, it is necessary to provide a suction device or the like, so there is a fear of the motor construction becoming rather complicated. In the case of electrostatic force or electromagnetic force, there is a fear of the electrostatic force or electromagnetic force adversely affecting the peripheral equipment, which is undesirable for use. In contrast, this multi-degree-of-freedom ultrasonic motor is of a simple construction, and can also be used in an environment where the use of electrostatic force, electromagnetic force or the like is not desirable.

Further, by controlling the amplitude of the ring member 76 through driving of the vibrator 3, the magnitude of the radiation pressure radiated from the ring member 76 is varied to vary the pressurizing force of the rotor 6 with respect to the step 75, whereby it is possible to perform torque control, positional control, number of rotation control or the like on this multi-degree-of-freedom ultrasonic motor.

Thus, by mounting an arm, an image pick-up device or the like (not shown) to the surface portion of the rotor 6 exposed through the distal end portion 76*a* of the ring member 76, it is possible to realize a multi-degree-of-freedom actuator, a camera for wide field range or the like.

Embodiment 10

Figure 26:
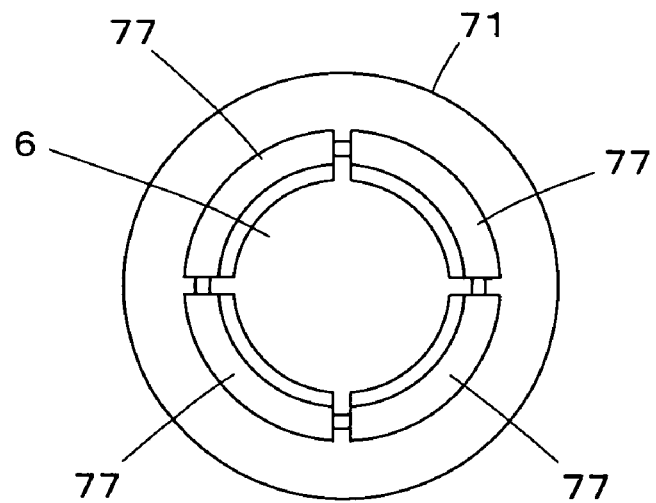
FIG. 26 is a plan view showing an ultrasonic motor according to Embodiment 10.

FIG. 26 shows a multi-degree-of-freedom ultrasonic motor according to Embodiment 10 of the present invention. In Embodiment 10, the annular ring member 76 of Embodiment 9 is circumferentially divided into four curved members 77. That is, the stator 71 has the four curved members 77 formed integrally, and the four curved members 77 are arranged at intervals in the circumferential direction of the rotor 6. Each curved member 77 has a curved configuration in conformity with the surface of the rotor 6, and the inner surface of each curved member 77 is in close proximity and opposed to the surface of the rotor 6.

With this construction, the four curved members 77 are divided from and independent of each other, so vibration can be easily caused. Thus, by vibrating each curved member 77 while out of contact with the rotor 6 through driving of the vibrator 3, it is possible to apply a preload effectively to the rotor 6.

Figure 27:
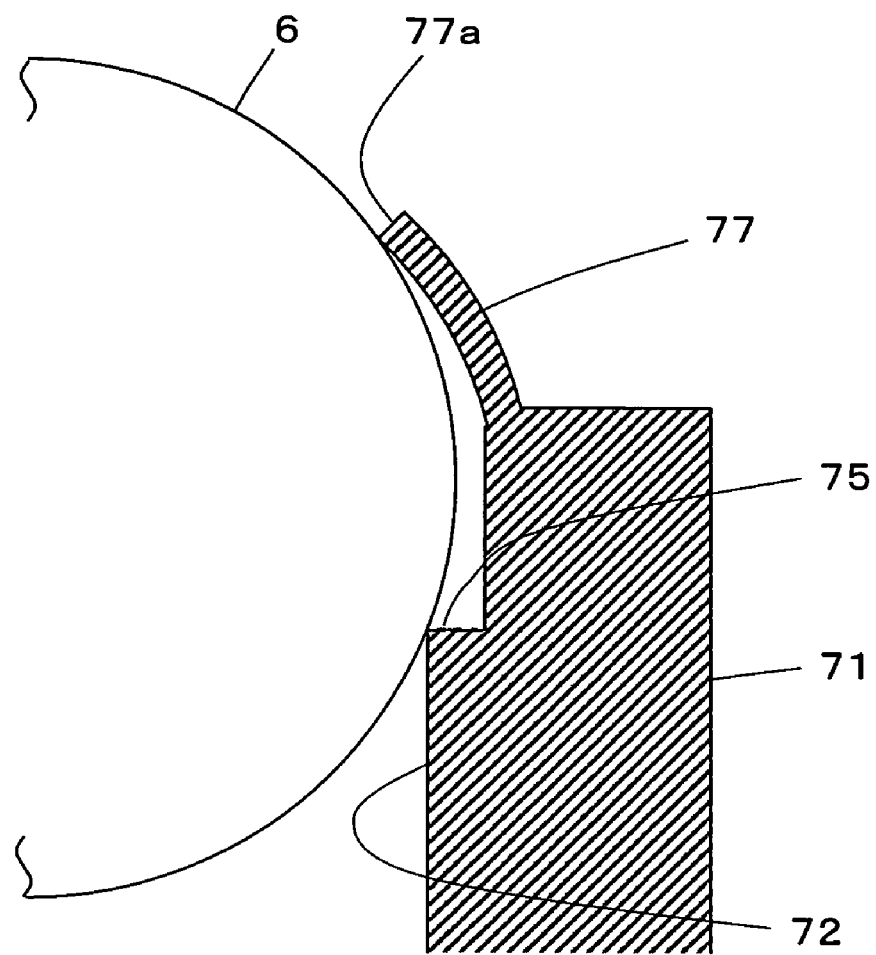
FIG. 27 is a partial enlarged sectional view showing an ultrasonic motor according to a modification of Embodiment 10.

The curved members 77 can be held out of contact with the rotor 6 whether they are vibrating or not. However, as shown in FIG. 27, when the vibrator 3 is at rest and is not vibrating, distal end portions 77*a* of the curved members 77 may be held in contact with the surface of the rotor 6. With this construction, it is possible to hold the rotor 6 while keeping the distal end portions 77*a* of the curved members 77 in contact with the surface of the rotor 6 not rotating when the vibrator 3 is at rest. In this case also, it is necessary for the curved members 77 to be spaced apart from the surface of the rotor 6 during vibration. It is possible for the curved members 77, which are in contact with the rotor 6 in the non-vibration state, to be formed so as to be raised from the rotor 6 during vibration by the radiation pressure of sound wave radiated from the curved members 77.

The number of curved members 77 is not restricted to four, and it is also possible to effect division into three or less or five or more curved members.

Embodiment 11

Figure 28:
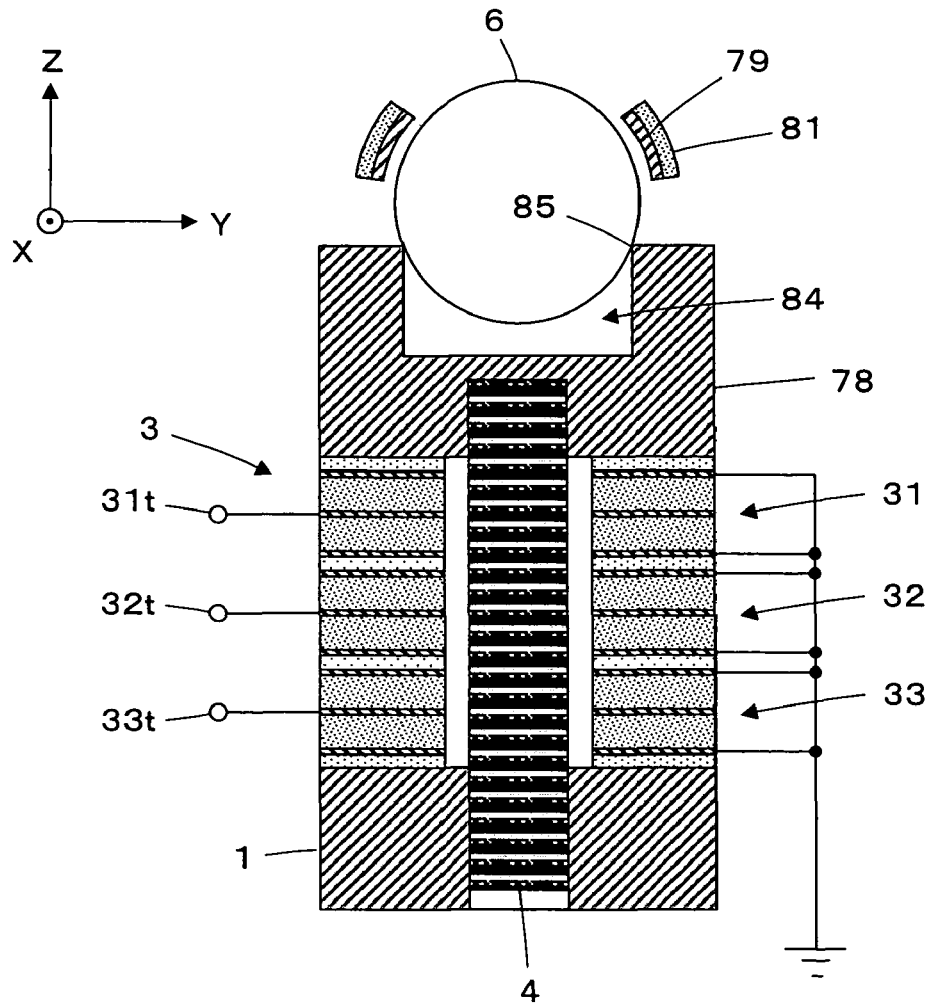
FIG. 28 is a sectional view showing an ultrasonic motor according to Embodiment 11.
Figure 29:
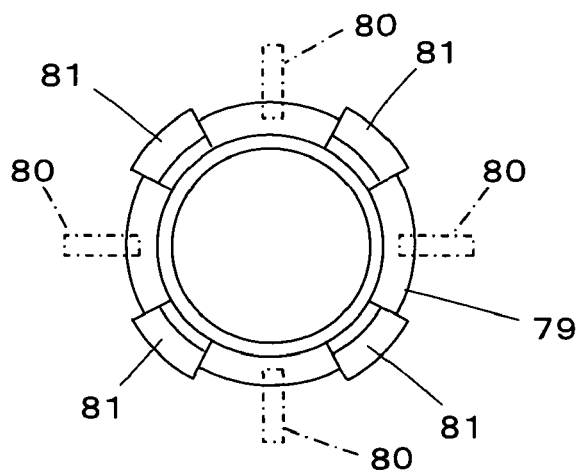
FIG. 29 is a plan view showing the ultrasonic motor of Embodiment 11.

FIG. 28 shows a multi-degree-of-freedom ultrasonic motor according to Embodiment 11 of the present invention. In Embodiment 11, instead of the ring member 76 provided integrally with the stator 71 in Embodiment 9, there is arranged a ring member 79 spaced apart from a stator 78. That is, the ring member 79 and the stator 78 are formed as members independent of each other, and are spaced apart from each other in the Z-axis direction. Like the ring member 76 of Embodiment 9, the ring member 79 is configured so as to be gradually diminished in diameter as it extends in the Z-axis direction, and its inner surface is in close proximity and opposed to the surface of the rotor 6, with the ring member being supported by support members 80 as indicated by dashed lines in FIG. 29. Further, four vibrators 81 for vibrating the ring member 79 are attached to the outer surface of the ring member 79. It is desirable to effect supporting by the support members 80 and attachment of the vibrators 81 at portions constituting nodes in the vibration mode when the ring member 79 is vibrated by the vibrators 81.

Figure 30:
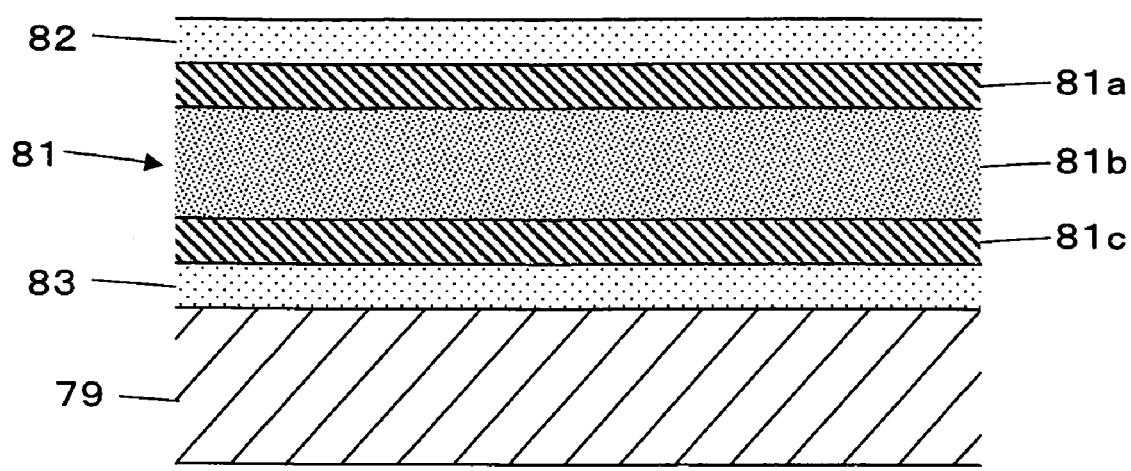
FIG. 30 is a partial sectional view showing the construction of a vibrator used in Embodiment 11.

As shown in FIG. 30, each vibrator 81 has a structure in which an electrode plate 81*a*, a piezoelectric element plate 81*b*, and an electrode plate 81*c* are successively superimposed one upon the other. The piezoelectric element plate 81*b* of each vibrator 81 is polarized so as to perform a deformation behavior of expansion or contraction in the thickness direction thereof. By applying independent AC voltage between the electrode plates 81*a* and 81*c*, it is possible to drive-control the vibrator 81. Insulation sheets 82 and 83 are respectively arranged on both surfaces of the vibrator 81, which is arranged while insulated from the ring member 79 through one insulation sheet 83.

As in the case of the stator 71 of Embodiment 9, the stator 78 is connected to the base block 71 by the connection bolt 4 while holding the vibrator 3 between the stator 78 and the base block 1. A recess 84 having an inner diameter smaller than the diameter of the rotor 6 is formed on the side of the stator 78 opposite to the surface in contact with the vibrator 3. An annular corner 85 situated in the XY-plane is formed at the opening end peripheral edge of the recess 84, and the rotor 6 is rotatably supported while held in contact with the corner 85.

In this construction also, when AC voltages whose phases are shifted by 90 degrees relative to each other are respectively applied through two terminals selected from the first terminal 31*t*, the second terminal 32*t*, and the third terminal 33*t*, vibration is generated in the stator 78, and elliptical vibration in a plane corresponding to the two selected terminals is generated at the corner 85 of the stator 78 in contact with the rotor 6.

At this time, when the vibrators 81 are drive-controlled, longitudinal vibration is generated in the ring member 79 in the thickness direction of the vibrators 81, that is, a direction orthogonal to the surface of the rotor 6, and the ring member 79 vibrates while out of contact with the rotor 6. As a result, the rotor 6 is pressurized against the corner 85 of the stator 78 by the radiation pressure of sound wave radiated from the ring member 79. Thus, as in Embodiment 9 described above, it is possible to realize a multi-degree-of-freedom ultrasonic motor of high torque and high efficiency and to prevent noise or the like due to contact of the ring member 79 and the rotor 6.

In addition, in Embodiment 11, the ring member 79 is driven by the vibrators 81, and the stator 78 is driven by the vibrator 3, making it possible for the ring member 79 to vibrate independently of the stator 78. Thus, by controlling the amplitude of the ring member 79 through driving of the vibrators 81, it is possible to easily perform torque control, positional control, number of rotation control, etc. on this multi-degree-of-freedom ultrasonic motor.

Further, it is possible to support the ring member 79 by the support members 80 at the positions of nodes formed when the ring member 79 is vibrated by the vibrators 81. This makes it possible to support the ring member 79 while minimizing the influence on the vibration of the ring member 79.

Further, it is also possible to hold the support members 80 elastically with respect to the stator 78 or the base block 1 by using a spring or the like (not shown).

As in the case of Embodiment 10 described above, the ring member 79 may be divided circumferentially into a plurality of curved members. In this case, the plurality of curved members may be supported by the support members 80 respectively at the positions of the nodes at the time of vibration, with one vibrator 81 being attached to each curved member. With this construction, since the plurality of curved members are separated from and independent of each other, vibration can be easily generated, and it is possible to effectively apply a preload to the rotor 6.

Although the ring member is arranged circumferentially with respect to the rotor, this should not be construed restrictively. Any other arrangement can be made as long as a preload can be generated by radiation pressure.

Further, as in the modification of Embodiment 10 described above, the ring member 79 may be elastically held so as to be brought into contact with the rotor 6 when the rotor 6 is at rest, and the vibrators 81 are vibrated during rotation of the rotor 6, with the ring member 79 itself being raised from the rotor 6 by the radiation pressure of sound wave radiated from the ring member 79.

While in Embodiments 9 to 11 AC voltages whose phases are shifted by 90 degrees are applied through two terminals selected from the first terminal 31*t*, the second terminal 32*t*, and the third terminal 33*t* of the vibrator 3, the angle by which the phases are shifted is not restricted to 90 degrees but allows variation. Further, the voltage values of the AC voltages applied may be varied. By variously controlling the AC voltages, it is possible to control the elliptical vibrations generated in the stator 71, 78.

Further, while in Embodiments 9 to 11 the contact of the stator 71, 78 with the rotor 6 is effected at a corner portion such as the step 75 or the corner 85, respectively, this should not be construed restrictively. As long as transmission of elliptical motion is possible, contact can be adopted through a flat surface or a curved surface, and the manner of contact may be other than the annular one.

Further, while in Embodiments 9 to 11 there is used a vibrator 3 which generates, as vibrations in three directions different from each other, longitudinal vibration in the Z-direction and flexural vibrations in the X and Y-directions, the vibrations may also be ones which are not thus orthogonal to each other. Further, while the vibrator generating vibrations in three directions uses piezoelectric elements corresponding to their respective directions, such as the first piezoelectric element portion 31, the second piezoelectric element portion 32, and the third piezoelectric element portion 33, it is also possible to synthesize vibrations of a plurality of piezoelectric element portions to generate the vibrations in the different directions, or to polarize one piezoelectric element portion into three or more to generate vibrations in two or more directions with a single piezoelectric element portion.

Further, while in Embodiments mentioned above two directions are selected from three directions to generate vibrations, it is also possible to apply AC voltage to all the piezoelectric elements corresponding to the three directions to generate a synthetic vibration under control of the phase and amplitude of the vibration in each direction.

The invention claimed is:

1. An ultrasonic motor comprising:
   a plurality of stators arranged so as to opposed to each other, each of the plurality of stators is formed in a ring-like configuration;
   a substantially spherical rotor held by the plurality of stators, wherein each of the plurality of stators is arranged so as to surround the rotor circumferentially in an annular fashion; and
   a single stator vibration means provided commonly for the plurality of stators and vibrating the plurality of stators so as to generate driving forces in the same direction to rotate the rotor, wherein the plurality of stators are arranged on both sides of the stator vibration means, with the stator vibration means provided therebetween.

2. An ultrasonic motor according to claim 1, wherein the plurality of stators are arranged on one side of the stator vibration means and are formed integrally with each other.

3. An ultrasonic motor according to claim 1, wherein the plurality of stators are supported at positions of nodes formed when they are vibrated by the stator vibration means.

4. An ultrasonic motor according to claim 1, wherein at least one of the plurality of stators is in contact with a surface of the rotor solely at a plurality of circumferential positions thereon.

5. An ultrasonic motor according to claim 4, wherein the plurality of positions are symmetrical with respect to the rotor.

6. An ultrasonic motor according to claim 1, wherein at least one of the plurality of stators has elasticity in a direction in which the rotor is held.

7. An ultrasonic motor according to claim 1, wherein the stator vibration means has three pairs of piezoelectric element plates for generating vibrations in three different directions, there being generated a synthesized vibration in which at least two of the vibrations in the three directions are combined with each other with their phases shifted relative to each other to thereby produce an elliptical motion at a portion where the stator is held in contact with the rotor.

8. An ultrasonic motor comprising:
a stator;
a rotor held in contact with and supported by the stator;
a stator vibration means for vibrating the stator to rotate the rotor;
a preload member arranged so as to be held in contact with a surface of the rotor at least when the ultrasonic motor is at rest so that a preload acts on the rotor only in the direction of the stator; and
a preload member vibration means for preloading the rotor with respect to the stator by vibrating the preload member.

9. An ultrasonic motor according to claim 8, wherein the preload member vibration means vibrates the preload member in a vibration mode different from that of the stator to thereby preload the rotor with respect to the stator.

10. An ultrasonic motor according to claim 8, wherein the preload member is arranged so as to be spaced apart from the stator, the preload member vibration means having a piezoelectric element plate mounted to the preload member.

11. An ultrasonic motor according to claim 10, wherein the preload member is supported at position of a node formed at a time of vibration by the piezoelectric element plate.

12. An ultrasonic motor according to claim 8, wherein the rotor has a substantially spherical configuration, the stator vibration means vibrating the stator to rotate the rotor around a plurality of axes.

13. An ultrasonic motor according to claim 12, wherein the preload member is formed in a ring-like configuration and is arranged so as to surround the rotor circumferentially in an annular fashion.

14. An ultrasonic motor according to claim 12, wherein the preload member has a contact member formed of a low friction material at its portion held in contact with the surface of the rotor.

15. An ultrasonic motor according to claim 12, wherein the stator is in contact with the surface of the rotor solely at a plurality of circumferential positions thereon.

16. An ultrasonic motor according to claim 15, wherein the plurality of positions are symmetrical with respect to the rotor.

17. An ultrasonic motor according to claim 12, wherein the stator vibration means has three pairs of piezoelectric element plates for generating vibrations in three different directions, there being generated a synthesized vibration in which at least two of the vibrations in the three directions are combined with each other with their phases shifted relative to each other to thereby produce an elliptical motion at a portion where the stator is held in contact with the rotor.

18. An ultrasonic motor, comprising:
a stator;
a substantially spherical rotor held in contact with and supported by the stator;
a stator vibration means for vibrating the stator to rotate the rotor;
a preload member opposed to the surface of the rotor; and
a preload member vibration means for vibrating the preload member at least when rotating the rotor to generate a preloading force for preloading the rotor with respect to the stator by a radiation pressure from the preload member.

19. An ultrasonic motor according to claim 18, wherein the preload member is formed of a ring member having a curved configuration corresponding to the surface of the rotor.

20. An ultrasonic motor according to claim 18, wherein the preload member is formed of a plurality of curved members each having a curved configuration corresponding to the surface of the rotor.

21. An ultrasonic motor according to claim 18, wherein the preload member is arranged so as to be spaced apart from the stator, the preload member vibration means having a piezoelectric element plate mounted to the preload member.

22. An ultrasonic motor according to claim 21, wherein the preload member is supported at position of a node formed at a time of vibration by the piezoelectric element plate.

23. An ultrasonic motor according to claim 18, wherein the preload member is formed integrally with the stator, the stator vibration means also serving as the preload member vibration means.

24. An ultrasonic motor according to claim 18, wherein the preload member is spaced apart from the surface of the rotor when vibrated by the preload member vibration means and is in contact with the surface of the rotor when not vibrating.

25. An ultrasonic motor according to claim 18, wherein the magnitude of the preloading force for preloading the rotor with respect to the stator is varied by controlling an amplitude of the preload member vibrated by the preload member vibration means.

26. An ultrasonic motor according to claim 18, wherein the stator vibration means has three pairs of piezoelectric element plates for generating vibrations in three different directions, there being generated a synthesized vibration in which at least two of the vibrations in the three directions are combined with each other with their phases shifted relative to each other to thereby produce an elliptical motion at a portion where the stator is held in contact with the rotor.

* * * * *